US006324547B1

(12) United States Patent
Lennert et al.

(10) Patent No.: US 6,324,547 B1
(45) Date of Patent: Nov. 27, 2001

(54) METHOD FOR CREATING AND MODIFING SIMILAR AND DISSIMILAR DATABASES FOR USE IN INTELLIGENT NETWORK CONFIGURATIONS FOR TELECOMMUNICATION SYSTEMS

(75) Inventors: Joseph Francis Lennert, Bolingbrook; Rowena F. Mahaney; William T. Mahaney, both of Yorkville; Curt R. Zawiski, Naperville, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/054,329

(22) Filed: Apr. 2, 1998

(51) Int. Cl.[7] .............................. G06F 17/30; G06F 12/00
(52) U.S. Cl. .......................... 707/204; 707/102; 379/242
(58) Field of Search ..................................... 707/100, 102, 707/103, 104, 200, 202, 204; 455/461, 414; 379/201, 242

(56) References Cited

U.S. PATENT DOCUMENTS

| | | | | |
|---|---|---|---|---|
| 5,056,086 | * | 10/1991 | Libonati | 370/259 |
| 5,440,541 | * | 8/1995 | Iida et al. | 370/352 |
| 5,475,746 | * | 12/1995 | Miller et al. | 379/201 |
| 5,481,601 | * | 1/1996 | Nazif et al. | 379/207 |
| 5,579,384 | * | 11/1996 | Seymour | 379/243 |
| 5,621,727 | * | 4/1997 | Vaudreuil | 370/401 |
| 5,740,230 | * | 4/1998 | Vaudreuil | 379/88.22 |
| 5,796,813 | * | 8/1998 | Sonnenberg | 379/220 |
| 5,838,774 | * | 11/1998 | Weisser, Jr. | 379/92.02 |
| 5,875,242 | * | 2/1999 | Glaser et al. | 379/207 |
| 5,881,140 | * | 3/1999 | Gerault et al. | 379/137 |
| 5,890,156 | * | 3/1999 | Rekieta et al. | 707/10 |
| 5,917,827 | * | 6/1999 | Cantwell | 370/466 |
| 5,937,343 | * | 8/1999 | Leung | 79/201 |
| 6,058,303 | * | 5/2000 | Astrom et al. | 455/413 |
| 6,058,412 | * | 5/2000 | Kojima et al. | 709/100 |
| 6,067,456 | * | 5/2000 | Duran | 455/461 |
| 6,085,194 | * | 7/2000 | Ige et al. | 707/10 |
| 6,154,467 | * | 11/2000 | Hager et al. | 370/467 |
| 6,188,759 | * | 2/2001 | Lorenzen et al. | 379/220 |

FOREIGN PATENT DOCUMENTS

| | | |
|---|---|---|
| 0 750 434 | 12/1996 | (EP) . |
| WO 0 96 25715 | 8/1996 | (WO) . |

OTHER PUBLICATIONS

Rochlin "An Information Model for Intelligent Network Services". SETSS Seventh International Conference, 1989, pp. 147–153.*
Robrock II "The Intelligent Network—Changing the Face of Telecommunications". Proceedings of the IEEE, vol. 79, No. 1, Jan. 1991, pp. 7–20.*
Koluch "Intelligent Networking—The Winning Edge for Personal Communicationss". IEEE 1994, pp. 1–5.*
Shimizu et al "Mass Calling Service". Singapore ICCS/ISITA 1992, pp. 1273–1276.*
Baughan "Transaction Capabilities—The New Dimension". Telecommunications Second IEE National Conference, 1989, pp. 411–417.*
Delory et al "Data Management in the Intelligen Network". Switching Symposium, XIII International, 1990, pp. 33–37.*

* cited by examiner

Primary Examiner—Thomas Black
Assistant Examiner—Uyen Le

(57) ABSTRACT

This invention uses a computer program to mine preexisting intelligent network data located in a variety of preexisting source intelligent network databases. The computer program either creates a new intelligent network database from parts of existing intelligent network databases or modifies an existing intelligent network database. The computer program replaces the current system's reliance upon manual data entry by data engineers to configure the operation of a new telecommunication switch or replace the software in a telecommunication switch that was damaged or requires a new intelligent network data configuration.

55 Claims, 18 Drawing Sheets

METHOD FOR CREATING AND MODIFING SIMILAR AND DISSIMILAR DATABASES FOR USE IN INTELLIGENT NETWORK CONFIGURATIONS FOR TELECOMMUNICATION SYSTEMS

FIELD OF THE INVENTION

This invention relates to a computer program that can create new intelligent network databases from all or parts of one or more existing databases containing data information for the operation of data and voice audio telecommunication switches. In addition, this program allows users to browse both similar and dissimilar databases to select the intelligent network data aspects of existing databases that can be copied into a new or modified database.

DESCRIPTION OF THE PRIOR ART

The configuration of telecommunication switches usually occurs in at least three environments. First, during the testing of switch hardware and software, a laboratory switch is configured to the requirements established for the test. Second, when a switch is sold to a customer, the switch is configured to the customer's specifications. Third, when a switch experiences a full failure, it often requires reconfiguration of the databases supporting the failed switch or configuration of new databases for an emergency backup switch or replacement switch. Normally, the configuration of telecommunication switches during these three environments requires the manual input of thousands and possibly millions of records of information. This process is extremely time consuming and can take weeks or months to complete.

In the first environment, telecommunication companies continually test new versions of switch software, peripheral devices and other hardware devices during the life of a telecommunication switch. When testing software or hardware, switch engineers design different operating environments to establish operating parameters of the new software or hardware. Data engineers manually input data to configure the operation of the switch for the designed test. Usually, the configuration of the testing environment is performed on a data build machine (computer). The configuration of the switch to simulate the desired testing operation conditions often involves retesting an archived configuration or modified archived configurations. Otherwise, the testing configuration is accomplished by manual data entry.

In the second environment, telecommunication switches sold to customers are configured based on the customer's intended operational conditions and requirements. Usually, the configurations for new switches are manually built using new data configurations that do not rely on existing database configurations. However, the configuration of features, switching software, and hardware is often adopted from other existing configurations.

The third operational environment is recovery of the switch after the switch has experienced a failure. These failures can result from equipment failure to natural disasters such as earthquakes, hurricanes or fires. Recovery of the failed switch sometimes requires the installation of an emergency backup switch. The emergency backup switch requires database configurations that replicate the databases in the damaged switch. Normally, the configuration of the emergency backup switch requires manual, time consuming input of data that will support specific customer features and routing of calls on the emergency backup switch. Having the ability to configure the telecommunication switch by transferring existing data information from known databases into new databases by automating the manual tasks of data entry would save considerable time, money and significantly improve productivity. In addition, instant access to many different switching systems is a critical task that currently requires many hours or days of research and manual browsing. A need exists for a robust process to automatically replace the current manual method data entry to configure intelligent network data for telecommunications switches.

SUMMARY

In order to automate the current manual data entry process of engineering intelligent network configuration databases, the computer program of this invention establishes a new database structure and mines source databases to load source database intelligent network data into the new intelligent network database structure. The computer program is capable of searching and automates many of the tasks for configuring a new intelligent network database from multiple source databases. This eliminates manual data entry for configuring new intelligent network databases for a telecommunication switch.

This computer program is multifunctional allowing for the browsing of all intelligent network databases prior to configuration. Once the target source intelligent network databases are determined, the computer program creates a new data directory structure and selectively copies all or part of the data from the source intelligent network databases into the new database. The computer program selects the source databases, the user identifies and selects the global point codes in the source databases, performs a best fit or manually configures the data, and converts the global point codes to new values. The computer program identifies whether common channel signaling exists, and if not configures a dialing plan, hardware equipment and network databases. The program allows a user to select between creating a switch based or network based intelligent network. The program supports the various services for the switch based and network based intelligent network. The program converts the data from binary format into ASCII formatted data. The network configuration data is configured for the new database and the network configuration data is reengineered for the new database. The data is extracted and converted to the same software release and loaded into the new network configuration data directory structure.

This invention provides accurate and timely customer information, significantly decreases the time interval for engineering a new database, decreases the research and data entry time, decreases the interval for lab planning and project management, improves intelligent network database integrity, provides a cleaner intelligent network database, reuses existing intelligent network data eliminating double data entry, reuses some existing software code, can use preexisting tools, and provides a platform for future growth and expandability. By accomplishing these tasks, the telecommunication switch manufacturer or telecommunication switch operator saves time, money and decreases time-to-market product and service schedules.

DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

DETAILED DESCRIPTION

The following applications are filed concurrently and are also incorporated by reference:
1. Method and Apparatus for Creating and Modifying Similar and Dissimilar Databases (U.S. Ser. No. 09/053,957), now U.S. Pat. No. 6,108,669.
2. Method for Creating and Modifying Similar and Dissimilar Databases for use in Hardware Equipment Configurations for Telecommunication Systems (U.S. Ser. No. 09/054,207), now U.S. Pat. No. 6,169,994.
3. Method for Creating and Modifying Similar and Dissimilar Databases for use in Dialing Plan Configurations for Telecommunication Systems (U.S. Ser. No. 09/054,094).
4. Method for Creating and Modifying Similar and Dissimilar Databases for use in Network Configurations for Telecommunication Systems (U.S. Ser. No. 09/053,961), now U.S. Pat. No. 6,055,227.
5. Method for Creating and Modifying Similar and Dissimilar Databases for use in Operator Services Configurations for Telecommunication Systems (U.S. Ser. No. 09/054, 206), now U.S. Pat. No. 6,243,712.
6. Method for Creating and Modifying Similar and Dissimilar Databases for use in Private Branch Exchange Configurations for Telecommunication Systems (U.S. Ser. No. 09/054,193).
7. Method for Creating and Modifying Similar and Dissimilar Databases for use in GSM Wireless Network Configurations for Telecommunication Systems (U.S. Se. No. 09/054,324).

Figure 1:
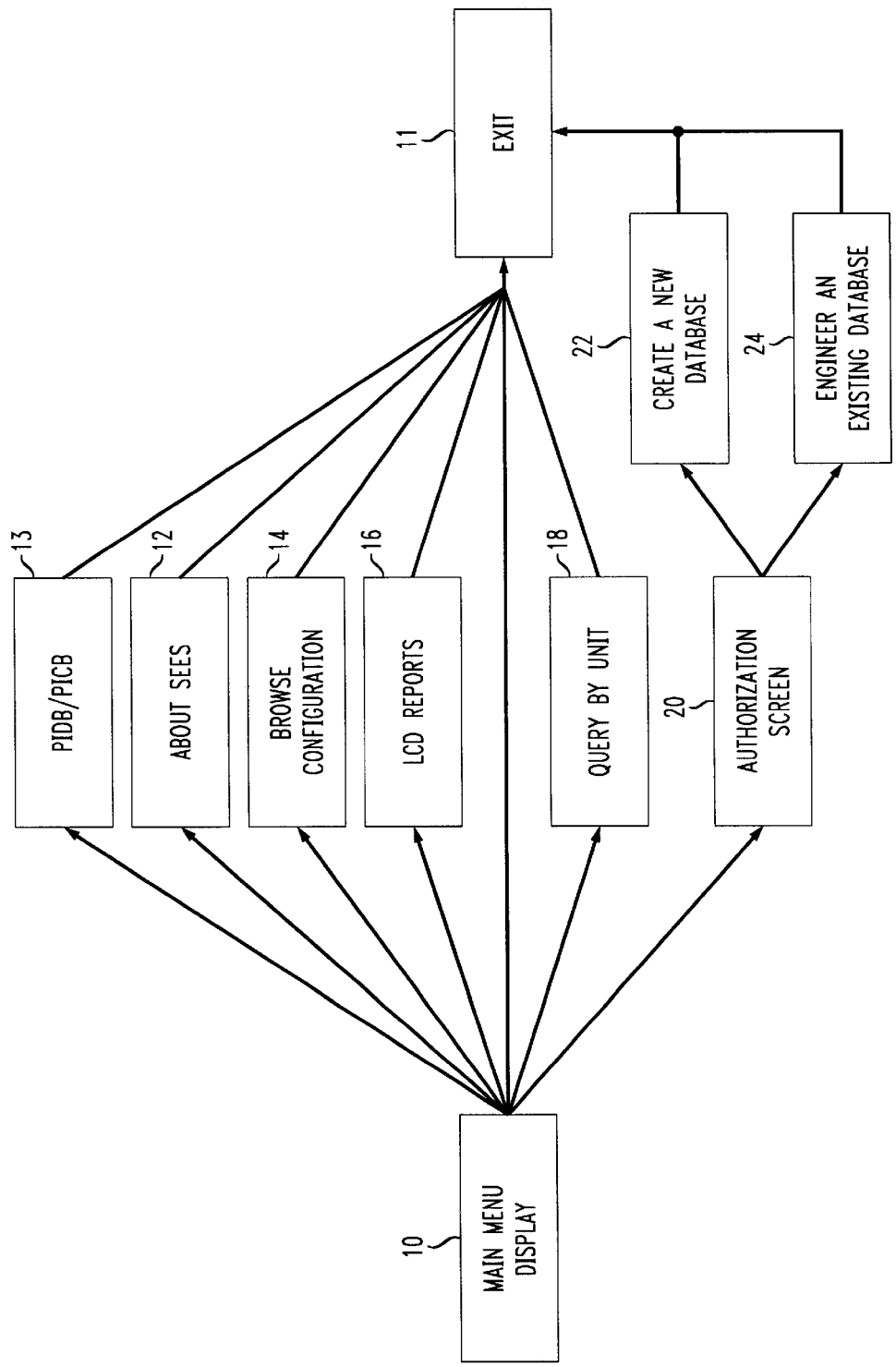
FIG. 1 is a functional flow chart illustrating the logical operations of the main menu of the computer program.

FIG. 1 illustrates the logical operation of the main menu of the user interface for the Simple Environment Engineering System ("SEES") computer program. If the SEES program is wrongly selected as the application of choice by the user, the main menu display 10 allows the user to exit 11 the computer program without choosing any of the functions. If the SEES program is selected as the program of choice by the user, from the main menu display 10, the user can select from one of seven operations.

These operations include: about SEES 12, peripheral interface data bus/peripheral interface control bus (PIDB/PICB) 13, browse feature 14, lab configuration document reports 16, query by unit 18, create a new database 22, or engineer an existing database 24. About SEES 12 is documentation about the computer program and the operations and features that a user can implement. Peripheral interface data bus (PIDB)/peripheral interface control bus (PICB) 13 allows a user to examine the peripheral units in the switching modules as they are connected to the interface control and data buses.

The browse feature 14 allows users to view the location and type of data in other databases. This feature allows the user to search for and find the desired data prior to generating new data from scratch. The lab configuration document reports 16 provide data on all the hardware for a given lab or for a customer's switch. Query by unit 18 identifies hardware items, features, signaling types, or other elements of the switch across many databases containing information on lab switches, manufacturers'switches, and/or customers' switches. Query by unit 18 also specifies and conforms targeting specific software releases to common versions.

The last two operations, create a new database and modify an existing database, have a guard dog or authorization screen 20 that prevents entry by unauthorized users into the program. Entry by unauthorized users beyond the browse feature impact existing source databases and source data resources. Allowing unauthorized users to create and modify existing source databases and source data resources can have severe effects on other operations due to the unintended destruction of valuable data. The computer program will query the user or the user's computer for authorization to gain access to those features of the program that allow for the creation or modification of intelligent network databases or data resources. Typical authorized users are data engineers. Once the screening process is complete, access is permitted, and another text or graphical user interface menu is displayed that allows the user to select features other than browse. From all six of these operations, a user can exit 11 the program.

The computer program uses all current data environments and employs functions to ensure that different versions of various software databases are converted to a common version. SEES provides accurate configuration information to customers on all environments to the switch module. SEES uses an office data administration tool called "init-office" to insure a clean initial database structure. SEES automatically updates the newest office data administration tool issues and environments.

Figure 2:
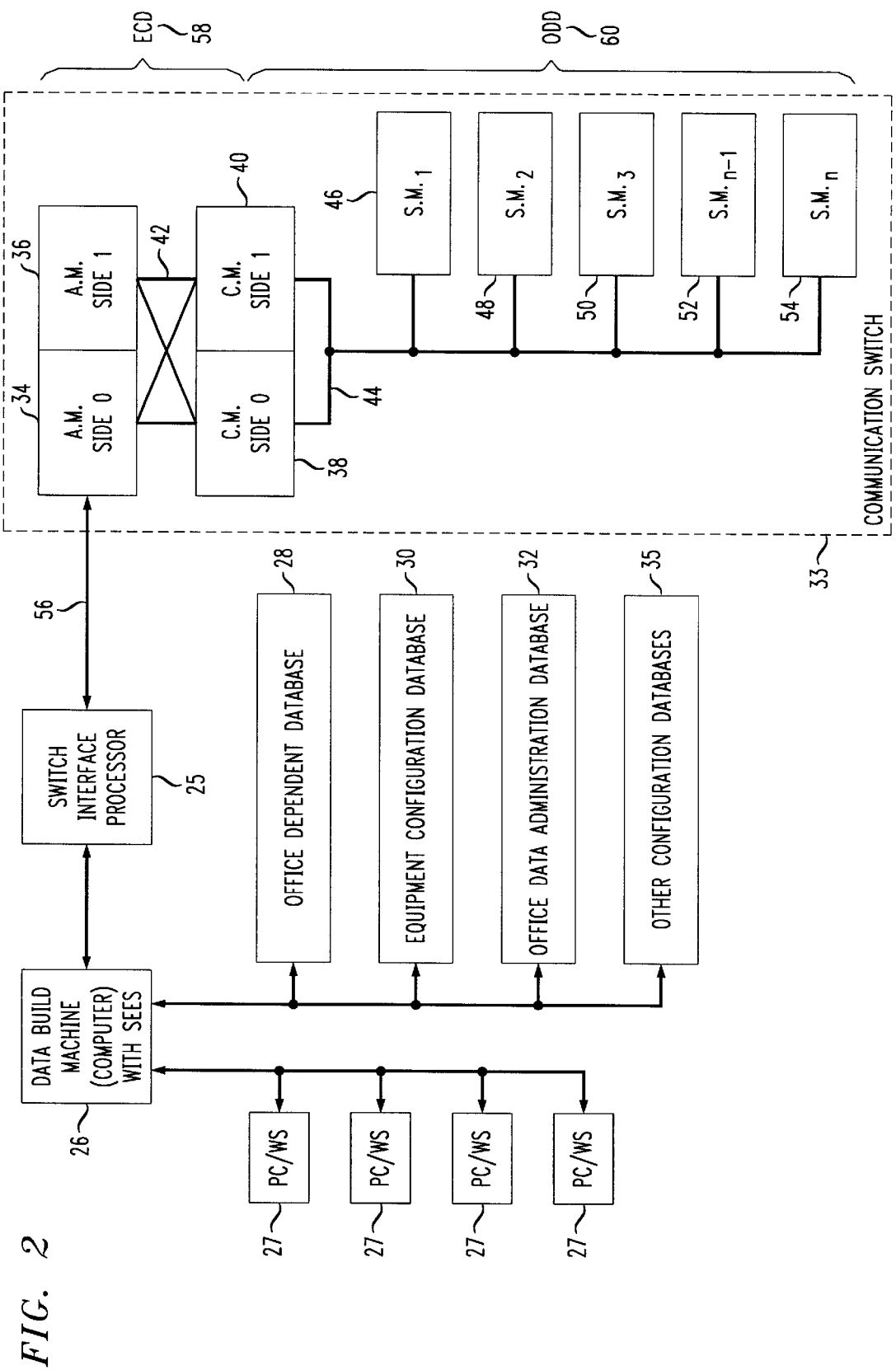
FIG. 2 illustrates the various hardware components and database types used in conjunction with the computer program.

FIG. 2 illustrates the various hardware components used in conjunction with a telecommunications switch 33. A data build machine 26 is used to create the data information used in the operation of a telecommunications switch 33. The data build machine 26 usually contains or has access to the source databases such the office dependant database 28, the equipment configuration database 30, the office data administration tools 32, and other configuration databases 35. The SEES computer program located on the data build machine 26 relies on various tools or routines to help in the execution of its operation.

Also connected to the data build machine 26 are a variety of personal computers or work stations 27. The data build machine 26 is also connected to a switch interface processor 25. The switch interface processor 25 is capable of connecting to other data build machines or communication switches 33. The connection 56 between the switch interface processor 25 and other communication switches 33 or data build machines can be a physical link such as a communication line (fiber, coaxial cable, twisted pair, etc.) or a nonphysical link such as transferring tapes or disks containing the data. Other communication links include radio frequency (RF) links by satellite transmission of data or wireless transmission of data.

Many telecommunication switches 33 have redundant administration modules represented by a zero side 34 and a one side 36. The redundant administrative modules 34 and 36 operate such that one of the modules is operating while the other one is on standby. If the operating administrative module fails, the administrative module on standby starts operating without causing a loss of services. This is also true for the redundant communication modules which have a zero side 38 and a one side 40. The administration modules 34 and 36 and the communication modules 38 and 40 are crossed linked by communication links 42. The cross linking of administration modules 34 and 36 with communication modules 38 and 40 eliminates the interruption of service should one of these modules fail. Connected via communication link 44 to the communication modules 38 and 40 are switch modules 46, 48, 50, 52 and 54. Each telecommunication switch 33 has at least one switch module (SM). The Lucent Technologies' SESS Switch can currently support up to 192 switch modules connected to the administrative modules 34 and 36 and communication modules 38 and 40.

The equipment configuration database 30 contains information regarding the administration modules 34 and 36 and part of the communication modules 38 and 40 (encompassing items corresponding to bracket 58 in FIG. 2). The equipment configuration database 30 keeps track of all the equipment hardware associated with the telecommunication switch 33 including the various equipment types of the hardware such as tape units, circuit packs, administration module links and disks containing the software versions used in conjunction with the hardware and all associated resources.

The office dependent database 28 contains information regarding part of the communication modules 38 and 40 and the switch modules 46, 48, 50, 52 and 54 (encompassing items corresponding to bracket 60 in FIG. 2). The office dependent database 28 is loaded on the memory disk in the administration modules 34 and 36 and is pumped or downloaded into the switch module memory. The office dependent database 28 provides call set up, functional feature capability of the switch modules, and defines all switch module hardware configuration information.

Figure 3:
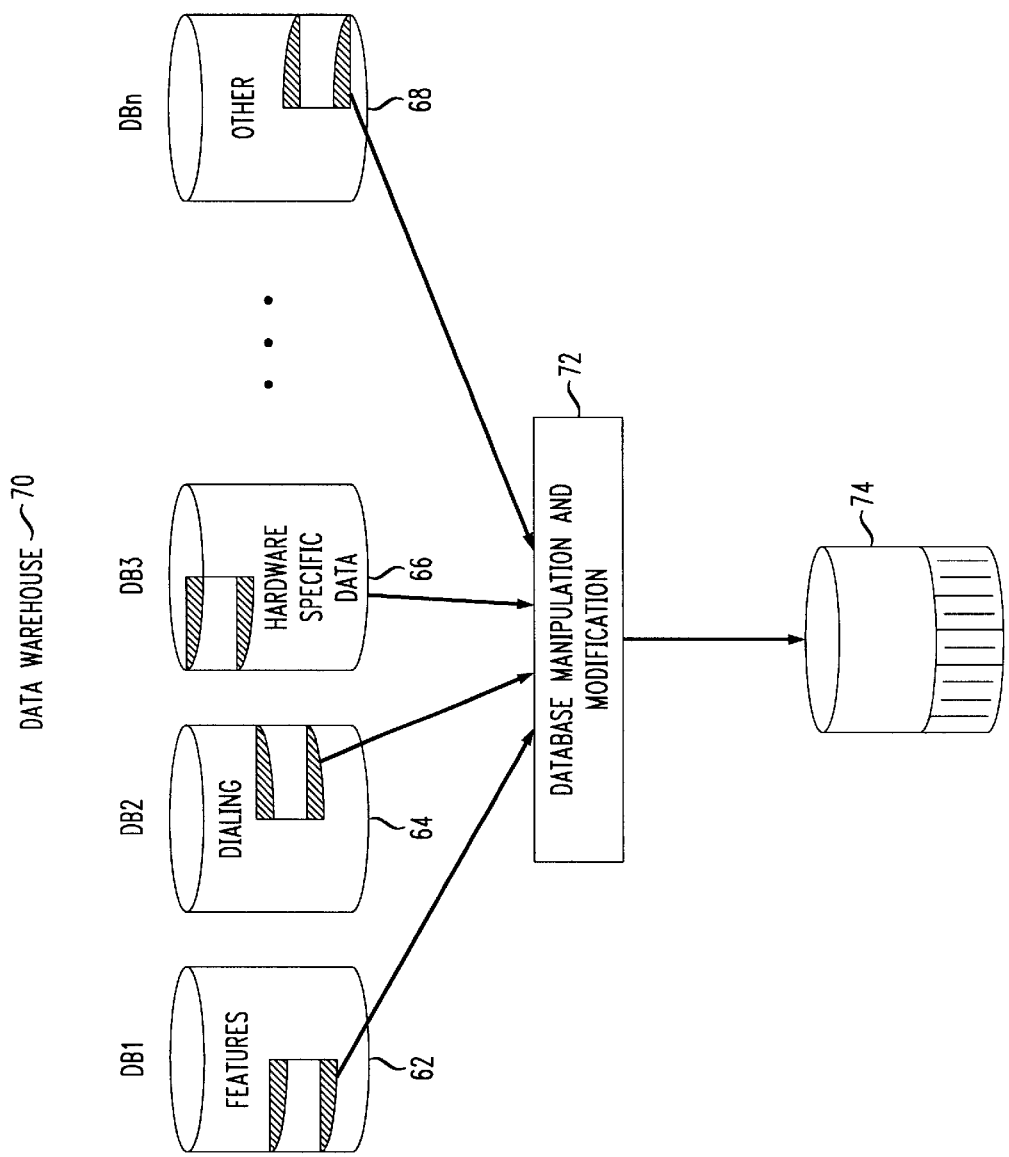
FIG. 3 illustrates the operation of the computer program as it builds a new database from parts of other databases.

FIG. 3 illustrates the operation of the Simple Environment Engineering System as it builds a new database from parts of other databases. In a typical setting, DB-1 62 contains information regarding features such as rate and routing information. DB-2 64 contains dialing information such as specific switch module configurations and networking rate and routing information. DB-3 66 contains hardware platform information such as additional switch module configurations. DB-n 68 are other databases in the data warehouse 70 containing information such as additional features or hardware. SEES identification routines browse the data warehouse 70 looking for desired components for reuse. In the database section modifier 72, SEES pulls new components from the various databases in the data warehouse 70 and with some modification such as altering the hardware designations for the software data, SEES creates a new database 74.

Figure 4:
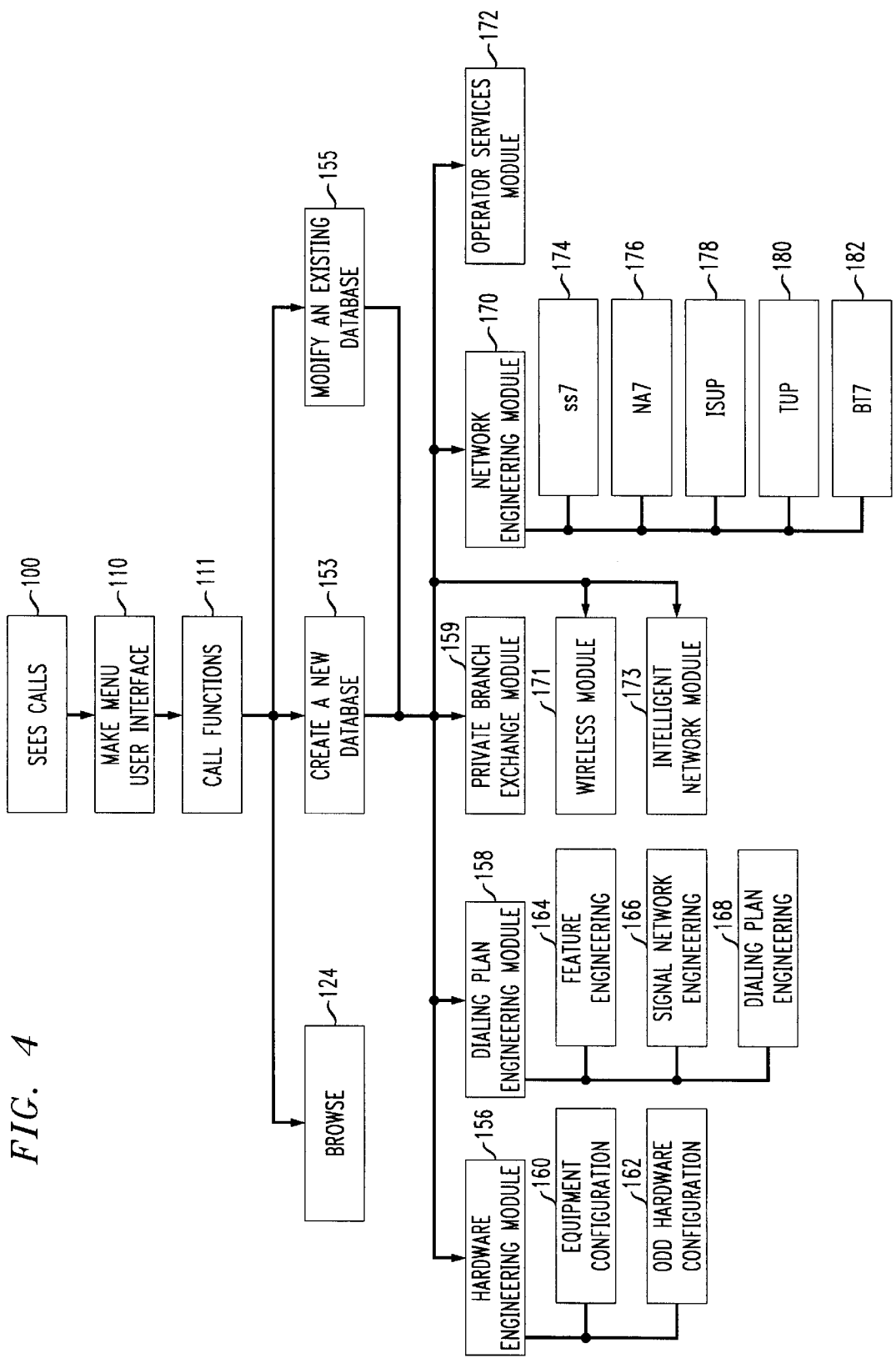
FIG. 4 is a flow chart of the overall features exercised in the operation of the computer program.

FIG. 4 illustrates the overall features of SEES. "SEES calls" 100 is a routine that calls other components of the program such as the make menu user interface (mkmenu) routine 110. The SEES' user interface allows a user to incorporate a variety of utilities including UNIX, web based languages, directories, databases, office data administration tools, DOS, and other applications. The make menu (mkmenu) routine 110 can be set up to use menu driven utilities employing streamlined commands, shortcuts, object menus, pictures or icons.

From the user interface screen 110, the user can call function 111 that implements the various configuration features of the computer program. The browse feature 124 restricts users to a read only environment but because of this restriction, allows many more unsophisticated users to use SEES to view the various databases used in the operation of a telecommunication switch 33. For more sophisticated users who have authorization to get past the guard dog 20, SEES queries as to whether a new database will be created 153 or whether an existing database will be modified 155. Either choice allows the user to select from one of the seven configuration scheme features of SEES.

The first feature of SEES is the hardware engineering module 156. This module includes the equipment configuration block 160 that allows users to examine the properties of the administrative modules 34 and 36 and the communication modules 38 and 40 used in the operation of a telecommunication switch 33. The office dependent database block 162 contains the data structures that control and describe the hardware and services for the various switching systems and contains information allowing the communication between the communication modules 38 and 40 and the switch modules 46, 48, 50, 52 and 54.

The second feature of SEES is the dialing plan engineering module 158. The dialing plan engineering module 158 includes the feature engineering block 164, the signal network engineering block 166 and the dialing plan engineering block 168. The feature engineering block 164 pulls existing features from other databases that contain feature definitions with embedded office dependant information into the new environment modified to the new database. The signal network engineering module 166 transfers data content regarding signaling information. The dialing plan engineering module 168 maps numbers that differentiate the route of the call and defines everything that is not hardware routing, trunking, lines, subscribers, and complete customer calling information.

The third feature of SEES is the network engineering module 170. The network engineering module 170 includes the signaling system 7 (ss7) block 174, the NA7 block 176, the ISDN user part (ISUP) block 178, the TUP block 180 and the British Telecom 7 (BT7) block 182. Other blocks can also be added that focus on the international standard of particular countries or particular telecommunication companies.

The fourth feature of SEES is the operator services feature 172. These services include but are not limited to directory assistance, automatic call distributor/distribution, toll and assistance applications, administrator measurements-operator, automated calling card services, automated operator trainer, automatic call distribution (ACD), busy line verification, and emergency alerts.

The fifth feature of SEES is the private branch exchange module 159. The private branch exchange module 159 is used to configure databases related to private branch exchange networks.

The sixth feature of the computer program is the intelligent network module 173. The intelligent network module 173 includes the dialing plan module 158, the hardware engineering module 156, and the network engineering module 170. These three components should be implemented prior to performing an intelligent network configuration.

The seventh feature of the computer program is the wireless module 171. The wireless module 171 includes the dialing plan module 158, the hardware engineering module 156, and the network engineering module 170. These three components should be implemented prior to performing a wireless configuration.

Figure 5:
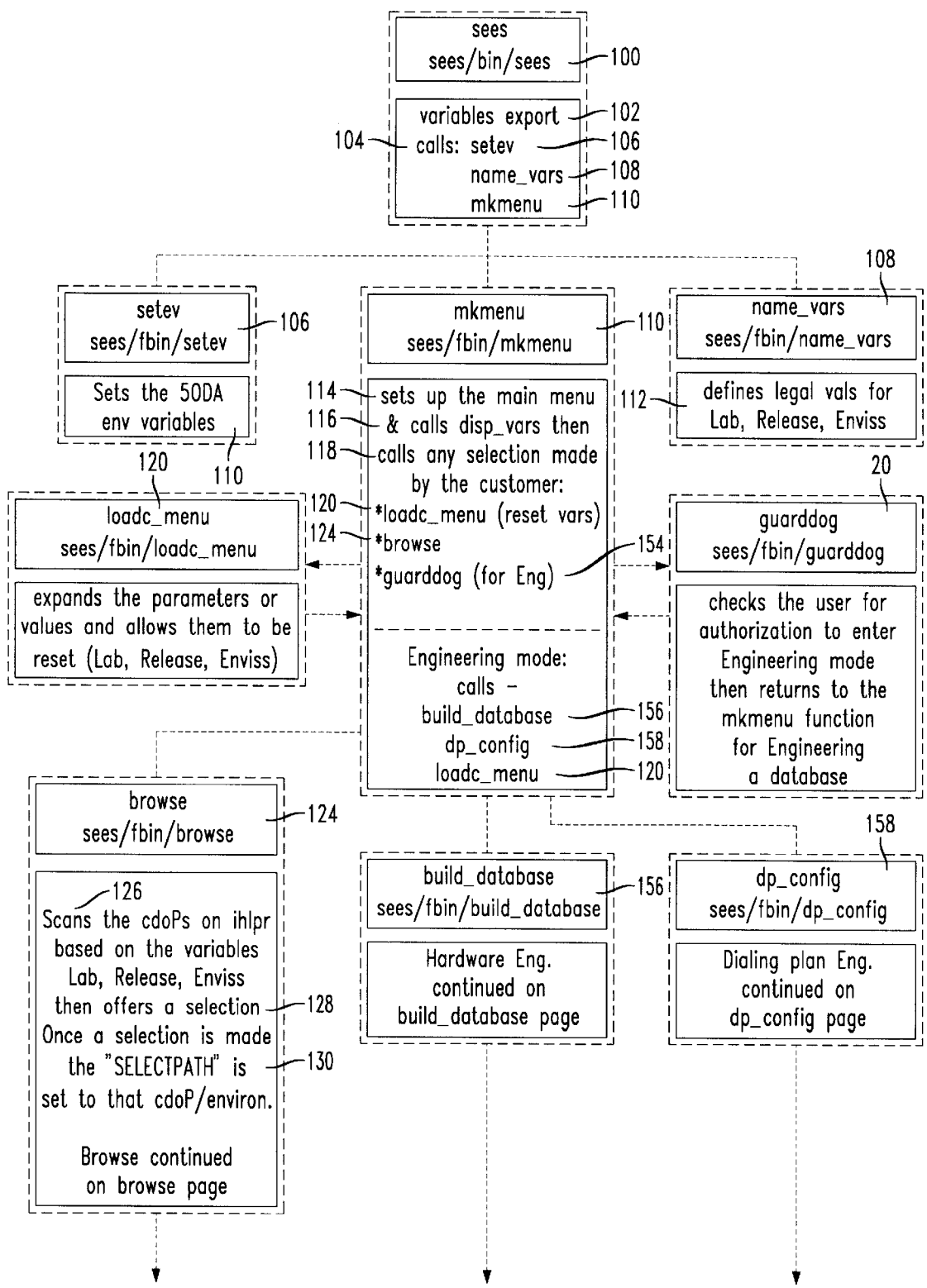
FIG. 5 is a flow chart of the logical operation of the computer program.

FIG. 5 is a flow chart of the logical operation of Simple Environment Engineering System. SEES 100 accesses variables 102 by calling the setev routine 106, the name variable (name_vars) routine 108 and the make menu (mkmenu) routine 110. The setev routine 106 sets the office data administration variables. The setev routine 106 also sets the office data administration environmental variables that provides a description of the functionality that setev routine 106 provides. The name variable (name_vars) routine 108 sets certain variable values. The name variables (name_vars) routine 108 defines legal values 112 for lab, release and enviss. Lab is the total testing environment that simulates the product being sold to the customer. Release is the hardware, software options (SWOPT), equipment configuration database and the office dependant database relating to the telecommunication switch 33 being used by SEES in the creation 153 or modification 155 of a database. The enviss routine is the environment tool version that the office data administration is supporting. The make menu (mkmenu) routine 110 sets up the main menu 114 and calls a display variable (disp_vars) routine 116, then calls any selection made by the user.

From the make menu (mkmenu) routine 110, the user can access the loadc_menu routine 120 that expands the parameters or values and allows them to reset lab, release and enviss. The make menu (mkmenu) routine 110 also allows the user to access browse 124, and the create a new database 153 or build an existing database 155. To either create a new database or build an existing database, the user must first pass a guard dog 20. The guard dog 20 functions as a screen permitting only authorized users into these sensitive areas of the data build machine 26 to either create 153 or modify 155 databases. The browse feature 124 allows users to view hardware and software configurations on known telecommunication switches 33.

Figure 6:
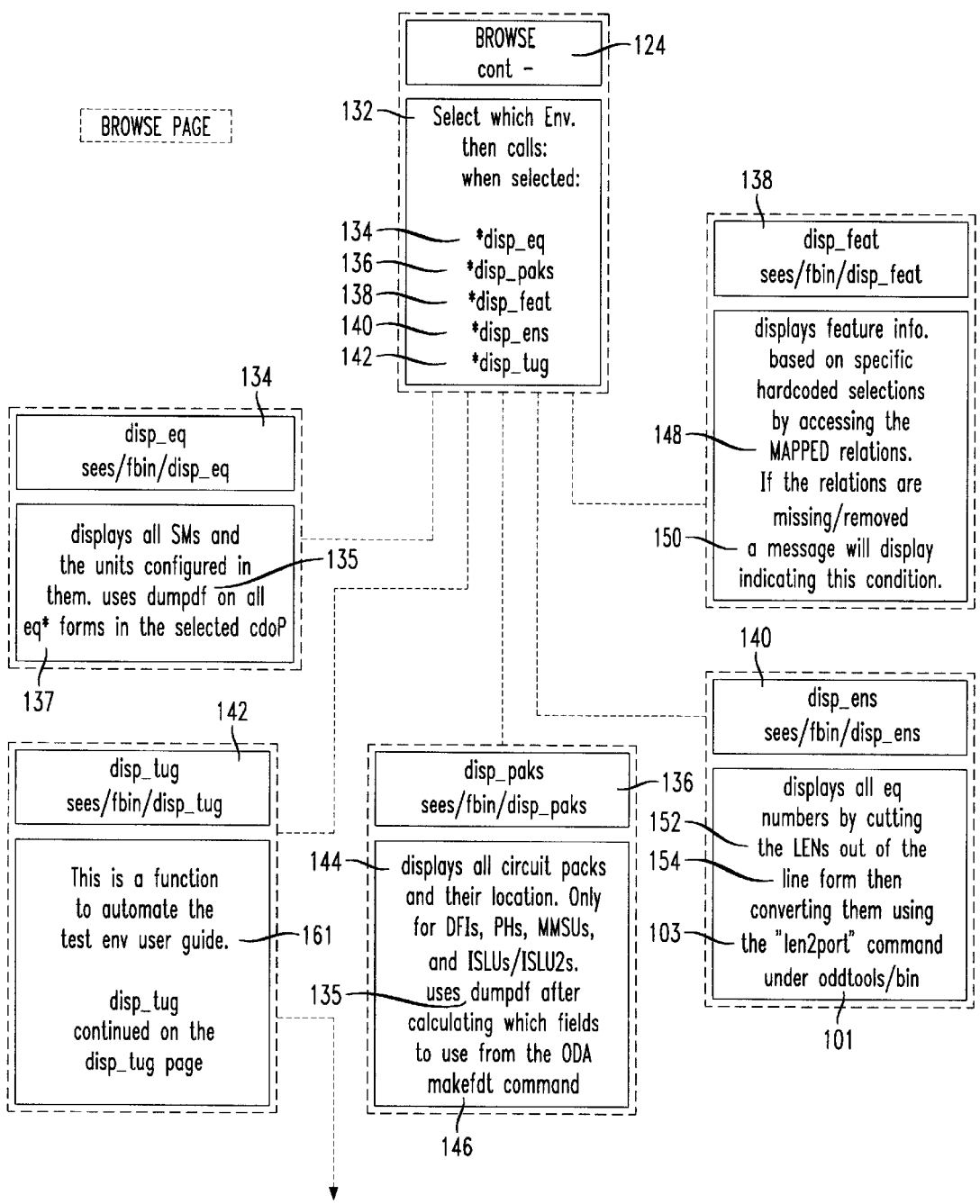
FIG. 6 is a flow chart of the browse feature of the computer program.

FIG. 6 illustrates the browse feature 124. The browse feature 124 allows the user to select the environment 132, then calls the display equipment (dis_eq) routine 134, the display packs (disp_paks) routine 136, the display features (disp_feat) routine 138, the display equipment number (disp_ens) routine 140 and the display the test user guide (disp_tug) routine 142. The display equipment (dis_eq) routine 134 displays all switch module and unit configuration within the switch module. The dumpdf routine 135 is used on all eq* forms (equipment related data) 137 in the selected circuit packs. The display packs (disp_pak) routine 136 displays all circuit packs 144 and their locations. The display packs (disp_paks) routine 136 uses dumpdf 135 after extracting the appropriate data to view from the office data administration makefdt command 146. The display feature (disp_feat) routine 138 displays the feature information based on specific hardcoded selections by accessing the mapped relations 148. If the mapped relations 148 are missing or removed, a message 150 will display indicating this condition. The display equipment number (disp_ens) routine 140 displays all equipment numbers by cutting the line equipment numbers 152 out of the data structures 154 and optionally, converts them using the len2port command 103 under oddtools/bin 101. The display test user guide (disp_tug) routine 142 automates the test environment user guide 161.

Figure 7:
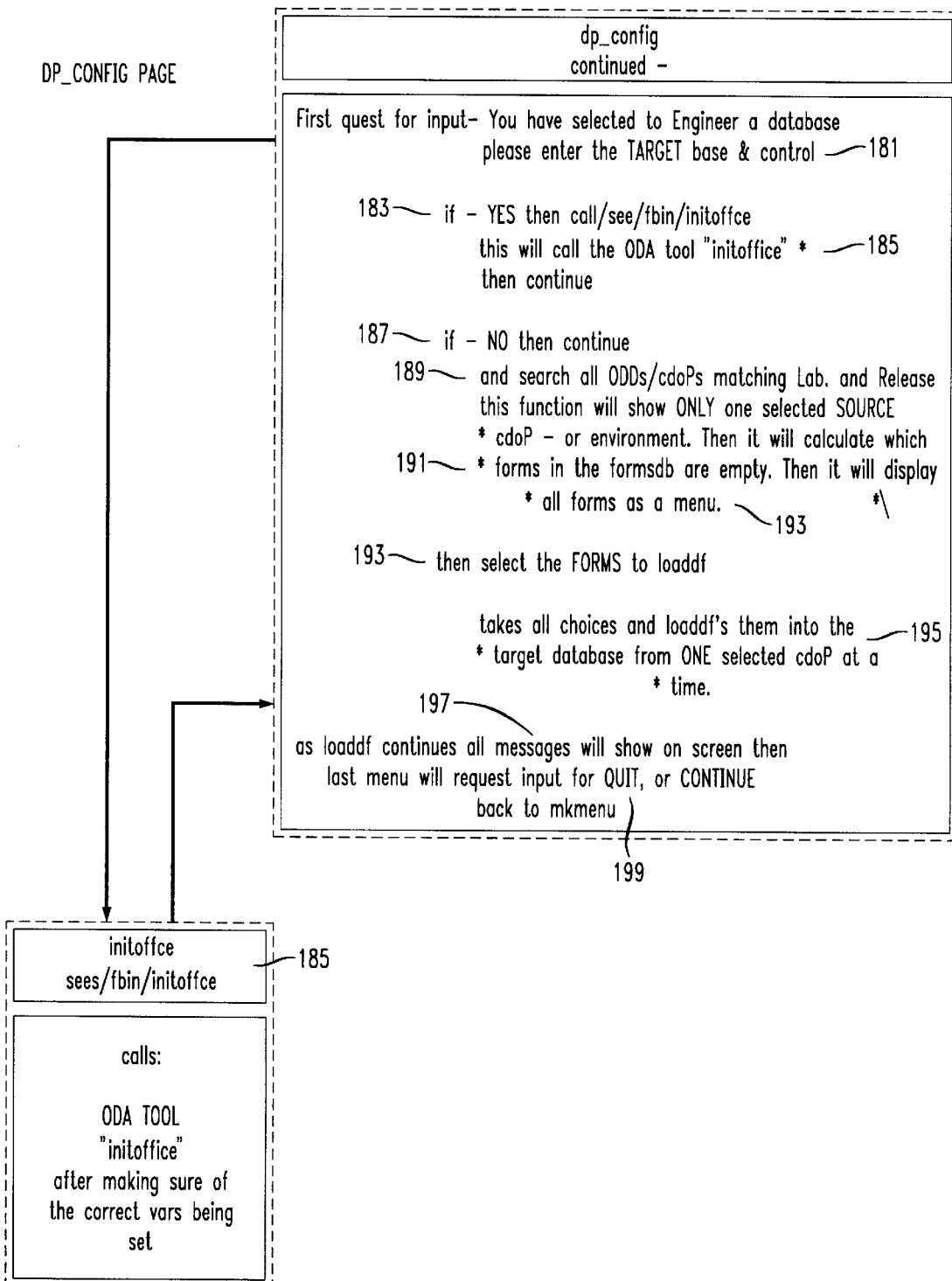
FIG. 7 is a flow chart of the dialing plan feature configuration of the computer program.

FIG. 7 illustrates the dialing plan configuration (dp_config) routine. The user is prompted for the target "base&control" 181. Base&control is the location where the new database is created and manipulated. If the user responds yes 183, then the computer program calls the office data administration tool initoffice 185. Init-office 185 builds a database structure containing no data. Init-office 185 calls an office data administration tool that confirms that the correct version of vars 108 is running. If the user responds no 187, then the computer program searches 189 all of the office dependent databases. This function will show only one selected source environment. Then it will determine those data elements in the data elements database that are empty 191. It will then display all data elements as a menu. The computer program then selects the data elements to load 193 and takes all choices and loads them into the new database structure 195. As the load process continues, all messages 197 will show on the screen then the last menu will request input for ending the dialing plan configuration 199.

Figure 8:
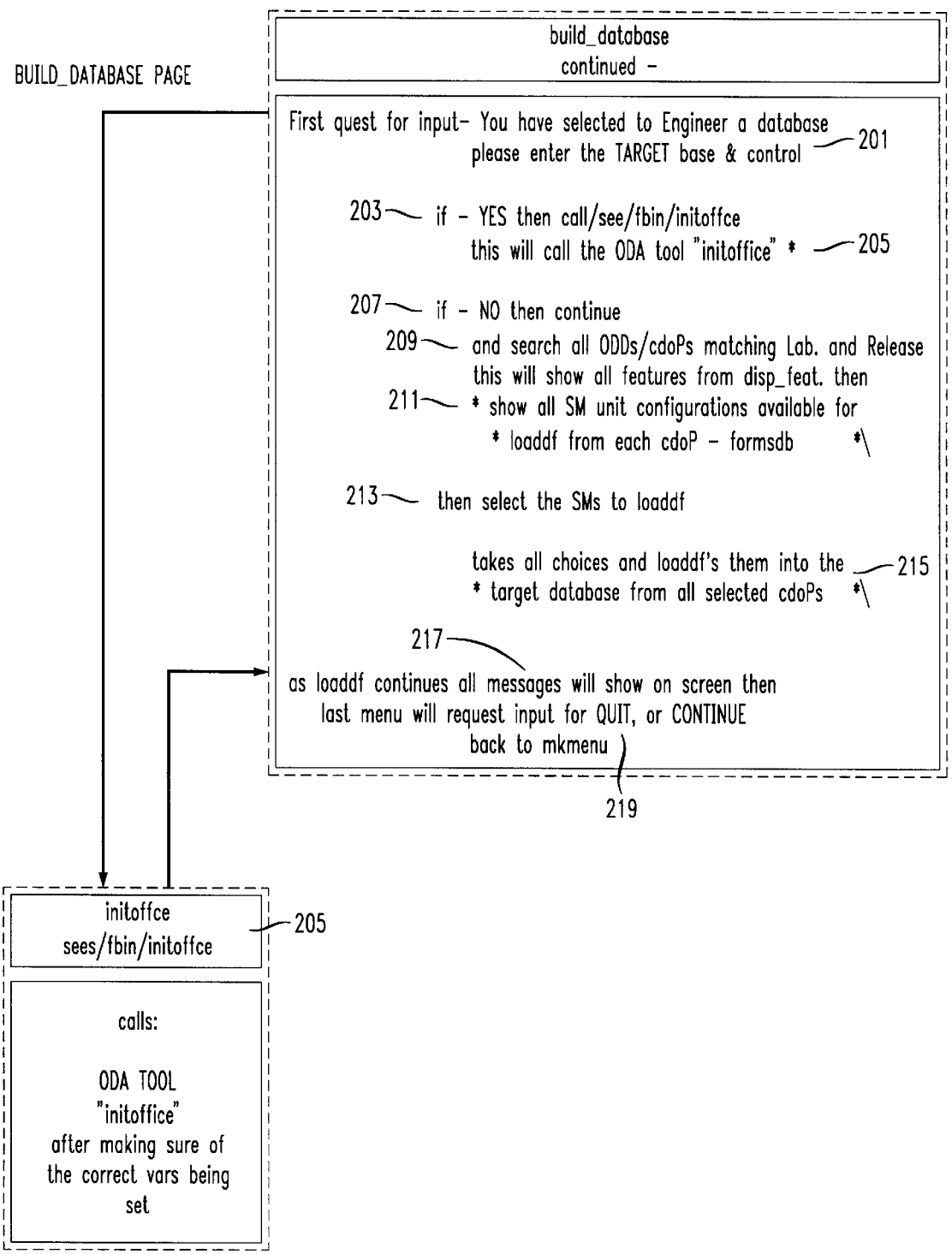
FIG. 8 is a flow chart of the build database feature configuration of the computer program.

FIG. 8 illustrates the build database feature. The user is prompted for the target "base&control" 201. From the response to the new location 203, then the computer program calls the office data administration tool init-office 205. The init-office routine 205 builds a database structure containing no data. The init-office routine calls 205 an office data administration tool that confirms that the correct version of vars is running. If the user responds no 207, then the computer program searches 209 all of the office dependent databases. This function will show all features and display all switching module configurations available to load into the data elements 211. The program will then allow the user to select those switching modules to load in the new data structure 213. The program takes all the user selected choices and loads them into the new database structure 215. As the load process continues, all messages 217 will show on the screen then the last menu will request input for ending the dialing plan configuration 219.

Figure 9:
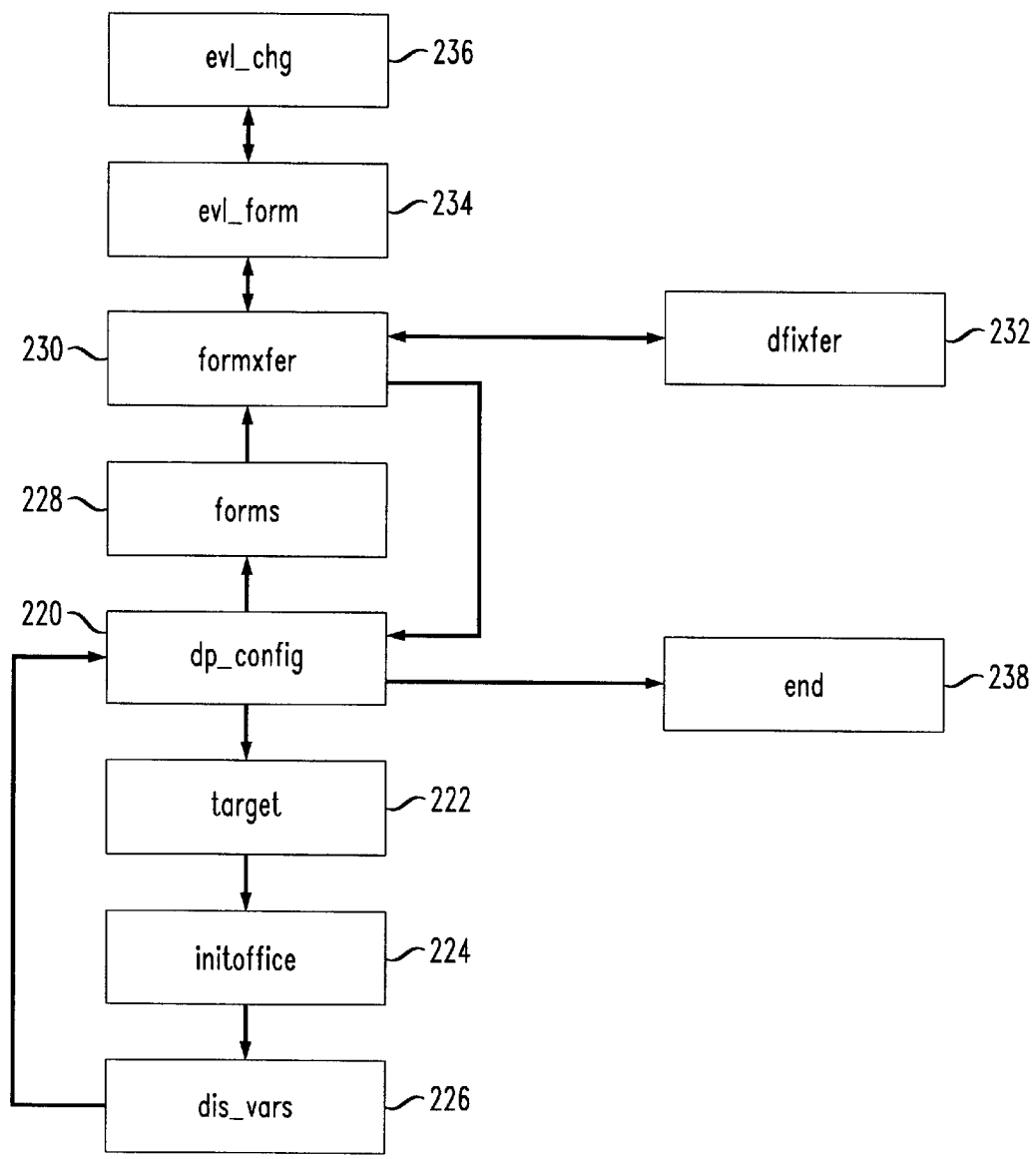
FIG. 9 is a flow chart of the dialing plan database feature configuration of the computer program.

FIG. 9 illustrates the dialing configuration (dp_config) feature 158 also starting from the engineering/create database. In the dialing plan (dp_config) feature 220, the dialing plan and feature engineering is accessed. The data is engineered from the office data administration tool data elements directly into the selected "base&control" or database. The computer program then prompts the user to select the target database 222. The computer program calls the initoffice routine 224 to check for an existing target database. Then prompts the user to select whether a predetermined database should be removed, or whether data should be added. If data is added to the predetermined database, then the existing database remains unchanged and a new database is created.

The computer program then calls the display variable (dis_vars) routine 226 to set and display selected variables.

These include lab, office data administration tools version through the env_menu routine. This will be used to select the data from preexisting databases to be engineered into the target database. The computer program then takes the user back to the dialing configuration (dp_config) feature 220 to obtain a list of data elements 228 from the selected source database or "base&control." Only those data elements 228 with data contained will be shown as a selection. The computer program displays all of the selected data elements from the source database and allows the user to select the individual data elements manually. This is a menu type screen with each form dynamically identified and selectable by number. The computer program then copies or dumps the user selected data elements into the target database or "base&control." All data elements will be error checked before the dump or copy. If this is a new database, a copy of the existing database is created. If this is an append to an existing database, then the computer program dumps the data to the existing data elements. However, existing data elements can not be over written. The computer program then calls the formxfer routine 230.

The formxfer routine 230 takes the existing data elements and executes the work to transferring the data elements using the routine TARGETTL to support the loading of evolved data elements. The computer program then calls the evl_form routine 234 to perform any necessary evolves prior to trying to loading the form. If no evolve is required, then the computer program calls the office data administration tool loaddf to transfer the data elements from the source to the target database.

The evlchg routine 236 takes one argument and the argument passed is the filename of the script that will be used to make the data changes when the evolve tool is executed. The computer program then calls the evl_form routine 234. The evl_form routine 234 takes two arguments. The first argument passed is the office data administration tool form name and the second argument is the filename where the contents of the office data administration tool form were dumped. This routine will check to see if there is a possible office data administration tool evolve to go between the two required generics and will perform all necessary step evolves to accomplish the tasks. The dfixfer 232 calculates the new trunk members in accordance with the new network or lab configuration form user assigned EN's. It will also differentiate between ENTRK1s, Ns, and trunk equipment numbers. If it is not, then ENTRK1 PASS is set to 1, so that the correct line in mkscript gets written to the SEDL script and conversely this also occurs for TRK1. This dynamically writes an evolve script, if a pathway exists, manipulating the data. The dfixfer routine 232 also checks for FIELDTYPE to determine if the last line to the SEDL script should be written. If the response is no, the computer program then returns to dp_config feature 220 after the evolve/transfer is completed. The computer program then prompts the user if the user wants to exit 238 or return to the main menu.

Figure 10:
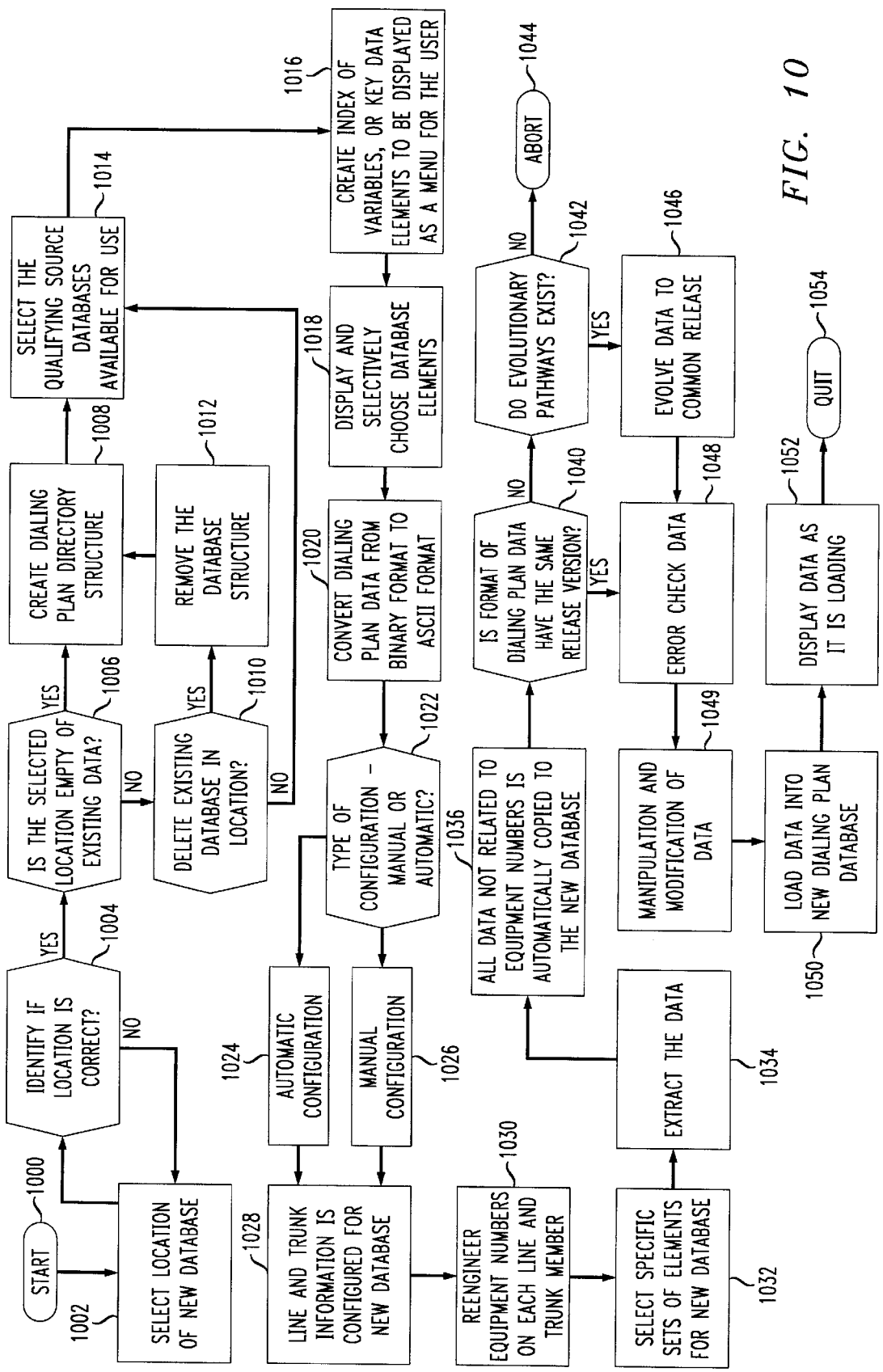
FIG. 10 is a flow chart of the dialing plan database feature configuration of the computer program.

FIG. 10 illustrates the process of engineering a new dialing plan configuration database or data resource from at least one source database or source data resource. The user calls and starts 1000 the computer program. The computer program can be located on one machine (a computer device) or multiple machines virtually connected via a network file share capability allowing all the virtual machines to appear as one machine and containing all existing source databases or source data resources. In the main menu of the computer program, a text or graphical user interface presents the main menu to the user allowing the user to select whether to browse existing source databases and source data resources or whether the user desires to create a new source database or engineer (modify) an existing source database from all or parts of other existing source databases or source data resources.

When the user selects the dialing plan engineering feature, the user is required to select the location of the new dialing plan database 1002. Selecting means selecting an item from a menu or inputting information such that the computer can react to the instruction. In addition, the user must select whether the new or modified dialing plan database should be located on the same machine (computer) or a virtual machine (computer), should the dialing plan database be created or modified, and whether the dialing plan database should be inclusively updated. The location of the new database 1002 is confirmed 1004 with the user and if the confirmation is not correct, the computer program allows the user to reselect a different location 1002.

The computer program searches or checks the node or location where the user intends the new or modified dialing plan database to be located. This node check will confirm the actual location of the dialing plan database, and whether the node is free 1006 on the desired machine (computer). The computer program confirms whether the selected location of the new database is empty of existing data 1006. If the response from the user is yes, the computer program creates a new dialing plan directory structure 1008. If the response is no, the program allows the user to delete the existing database 1010. If the database is deleted, the program removes the database structure 1012 and creates a new dialing plan directory structure 1008. The dialing plan directory structure can be created to hold similar and dissimilar size data as compared to the source databases.

If the existing database structure is not deleted, or the program created a new dialing plan directory structure, the computer program then allows the user to select the qualifying source databases available for use 1014. The source databases might have access utilities to assist in the configuration of a new database. The computer program then selects qualifying existing source data resources using the user set criteria in input when the user was prompted to select the lab, machine (computer), site, customer name, and software release. The computer program requires the user to select and input certain elements regarding the characteristics desired in the new dialing plan database to be created in order to search existing source databases and source data resources for existing data. For example, the user will be prompted to select the lab, the computer or machine, the site location of the new or modified dialing plan database, the customer name, the software release, and the version of the source database or source data resource.

Next, the computer program synchronizes the source database access utilities with the same versions that correspond to the existing source database or data source resource versions. This allows the source database access utilities to properly interface with the various existing source database or source data resource versions. The dialing plan data selected from the existing databases or data resources to be copied into the new, empty dialing plan data directory structure can be selected from related or unrelated data resource types.

An index 1016 is created of variables or key data elements and are displayed in a menu for the user. The computer program generates path locations (file pointers) to the location of each dialing plan data resource on the same or virtual machine (computer). All existing resources are then displayed 1018 to the user in a modified subset, easy to read type format, that satisfy the criteria selected by the user when the user was prompted to select the lab, machine (computer), site, customer name, and software release in creating the new dialing plan data resource, or merging with an existing data resource when the user selected the desired hardware engineering feature.

The dialing plan data encompasses digit analysis data such as routing digits, digit selectors, digit tables, and announcements. The routing digits can include announcements and signaling types. In addition, the digit analysis data can include billing types such as multimetering, and automated message accounting.

The dialing plan data can encompass subscriber equipment numbers such as originating subscriber equipment numbers and terminating subscriber equipment numbers. The dialing plan data can encompass trunk group data such as trunk member data that support the standard 24 channel and 30 channel pulse code modulation (PCM) multiplexing. The trunk member data can also include equipment numbers such as logical test port data capable of supporting virtual channels within a switching processor, recorded announcement equipment numbers linking subscribers to recorded messages, analog equipment numbers, digital equipment numbers (ISDN and interpacket traffic), packet switching equipment numbers, analog trunk equipment numbers, logical test port equipment numbers, and recorded announcement equipment numbers.

The user selectively chooses database elements and the program converts dialing plan data from binary format to ASCII format 1020. The resources queried in the computer program comprise key dialing plan data elements extracted from each resource being queried by using a utility for converting the dialing plan data in a binary format to an ASCII format and the ASCII formatted data is placed into a memory structure for future use.

The computer program allows the user to select the type of configuration 1022, either automatic configuration 1024 or manual configuration 1026. The line and trunk information is configured for the new database 1028. The computer program reengineers the equipment numbers on each line and trunk member 1030 and allows the user select specific sets of data elements for the new dialing plan configuration database 1032 and the ASCII formatted data is placed into the memory structure. The data is extracted 1034 and all data not related to the equipment numbers is automatically copied into the new dialing plan configuration database 1036.

The computer program determines if this format is the same version or release as the new database structure 1040. This is accomplished by matching the selected criteria in the software release with the new or existing software release of the directory structure and name. If the format is not the same, the computer program determines if evolutionary pathways exist 1042. If the evolutionary pathways do not exist, the computer program aborts 1044. If the evolutionary pathways exist 1042, the program calls an evolution tool 1046, to modify the saved data so that consistency with the new location is maintained.

If the format is the same version or release as the new database structure 1040, or after the evolution of data has occurred 1046, the data is error checked 1048. The program dynamically manipulates and modifies the data 1049. All selected dialing plan data that is saved is loaded 1050 or merged into a new or existing dialing plan data resource using a platform utility that converts the data from an ASCII format to a binary format and loads the data into the database. The computer program displays 1052 all the statistics of the data elements as they are being loaded into the selected location. In addition, the computer program displays errors, updates, non-updates to the selected location data resource. The computer program then allows the user to return to the main menu or quit, (exit the program) 1054.

Figure 11:
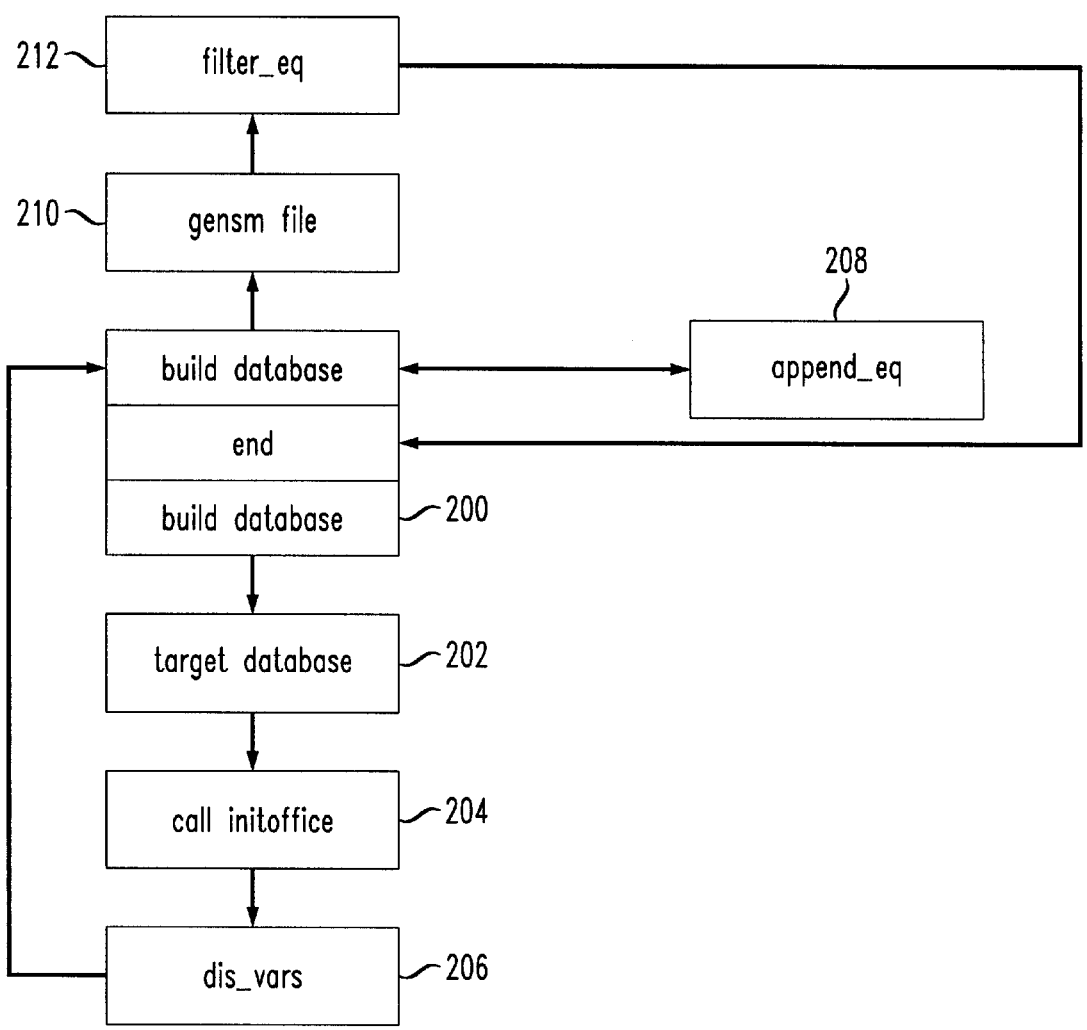
FIG. 11 is a flow chart of the hardware equipment database feature configuration of the computer program.

FIG. 11 illustrates the use of SEES to engineer existing databases. In the build_database feature 156, SEES uses the hardware configurations on the office data administration tool data elements for engineering the new database or modifying an existing database. Data will be engineered from the office data administration tool data elements directly in the selected base and control database. In block 200, the user will be prompted to input the target database in block 202. SEES then calls the initoffice routine 204 to check for an existing target database. The user is prompted to input whether that database should be removed, or data will be added to it. If data is added, then a new database is created and the existing data is removed. SEES then calls the display variable (dis_vars) routine 206 to set and display selected variables. These includes the lab, office data administration tool version through the env_menu routine. This will be used to select the data from preexisting databases to be engineered into target databases.

The user now returns to the build_database feature 200 to obtain a list of possible hardware switch module configurations from the selected source database or "base&control." Those markets shown are dependent upon the initial settings of the computer program. The computer program then shows all selected configurations from the source databases, and allows the user to select the individual switch modules manually. This information is presented to the user in a menu type screen with each of the switch module configurations dynamically identified and selectable by number. The build_database feature 200 then calls apppend_eq routine 208 can automatically determine the keys for office data administration tool data elements and to include multivalued keys in the lines output for selecting.

The computer program copies or dumps the user selected switch module configurations into the target database or "base&control." All the data is error checked before the dump or copy. If this is a new database, then it effectively becomes a copy of the existing database. If the new database is an append to an existing database, then it becomes a dump to the existing data elements. Therefore ensuring that any existing data is not rewritten. However, if the keys match, the data is over written.

The computer program uses the gensm routine 210 as a reference for selecting the proper hardware office data administration tool data elements to use while transferring the data. The program uses the (filter_eq) routine 212 to use the user temporary directory USRTMP globally then the TARGETTL files to support the loading of evolved data elements. The program then calls the evl_form to perform any necessary evolves prior to loading of the data elements. This dynamically writes an evolve script, if a pathway exists, manipulating the data. The program then takes the user back to the build_database after the evolve/transfer of data is completed. SEES then prompts the user to quit or return to the main menu.

Figure 12:
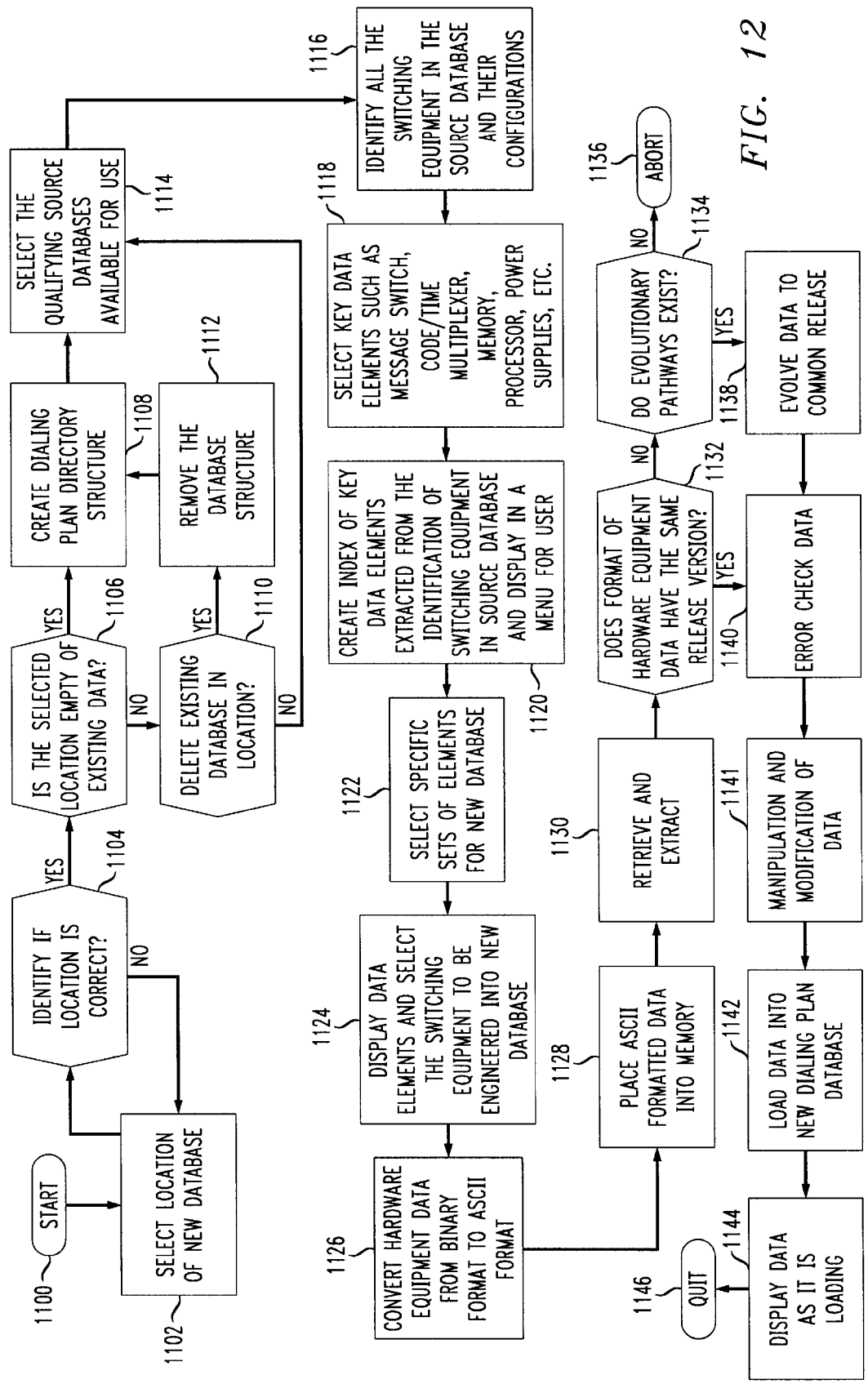
FIG. 12 is a flow chart of the hardware equipment database feature configuration of the computer program.

FIG. 12 illustrates the process of engineering a new hardware equipment configuration database or data resource from at least one source database or source data resource. The user calls and starts 1100 the computer program. The computer program can be located on one machine (a computer device) or multiple machines virtually connected via a network file share capability allowing all the virtual machines to appear as one machine and containing all existing source databases or source data resources. In the main menu of the computer program, a text or graphical user interface presents the main menu to the user allowing the user to select whether to browse existing source databases and source data resources or whether the user desires to create a new source database or engineer (modify) an existing source database from all or parts of other existing source databases or source data resources.

When the user selects the hardware equipment engineering feature, the user is required to select the location of the new dialing plan database 1102. Selecting means selecting an item from a menu or inputting information such that the computer can react to the instruction. In addition, the user can select whether the new or modified hardware equipment database should be located on the same machine (computer) or a virtual machine (computer), should the hardware equipment database be created or modified, and whether the hardware equipment database should be inclusively updated. The location of the new database 1102 is confirmed 1104 with the user and if the confirmation is not correct, the computer program allows the user to reselect a different location 1102.

The computer program searches or checks the node or location where the user intends for the new or modified hardware equipment database to be located. This node check will confirm the actual location of the hardware equipment database, and whether the node is free 1106 on the desired machine (computer). The computer program confirms whether the selected location of the new database is empty of existing data 1106. If the response from the user is yes, the computer program creates a new hardware equipment directory structure 1108. If the response is no, the program allows the user to delete the existing database 1110. If the database is deleted, the program removes the database structure 1112 and creates a new hardware equipment directory structure 1108. The hardware equipment directory structure can be created to hold similar and dissimilar size data as compared to the source databases.

If the existing database structure is not deleted, or the program created a new hardware equipment directory structure, the computer program then allows the user to select the qualifying source databases available for use 1114. The source databases might have access utilities to assist the in the configuration of a new database. The computer program then selects qualifying existing source data resources using the user set criteria in input when the user was prompted to select the lab, machine (computer), site, customer name, and software release. The computer program requires the user to select and input certain elements regarding the characteristics desired in the new hardware equipment database to be created in order to search existing source databases and source data resources for existing data. For example, the user will be prompted to select the lab, the computer or machine, the site location of the new or modified hardware equipment database, the customer name, the software release, and the version of the source database or source data resource.

The computer program instructs the user to identify all the switching equipment in the source databases and their respective configurations 1116. The switching equipment hardware includes message switch data, code multiplexing equipment data, time multiplexing equipment data, memory equipment data, processor data, power supply equipment data, packet handling equipment data, digital interface data, analog interface data, announcement hardware platform data, echo canceller data, and subscriber line interface data. The subscriber line interface data includes data that supports xDSL traffic (asynchronous, consumer, high-bit-rate, and very high speed), ISDN traffic and plain old telephone service (POTS) traffic.

The user selects the key data elements such as the message switch, code multiplexers, time division multiplexers, memory, processors, and power suppliers 1118. The computer program creates an index 1120 of the key data elements extracted from the identification of the switching equipment in the source database. This information is then displayed to the user in a menu format.

The user selects 1122 the specific sets of data elements for the new database. These data elements are displayed 1124 and the user selects the switching equipment to be engineered into the new database. The computer program converts 1126 the hardware equipment data from the binary formatted data to an ASCII format and places the ASCII formatted data into memory 1128.

The data is retrieved and extracted from a file or from memory 1130. After extraction, the computer program determines if this format is the same version or release as the new database structure 1132. This is accomplished by matching the selected criteria in the software release with the new or existing software release of the directory structure and name. If the format is not the same, the computer program determines if evolutionary pathways exist 1134. If the evolutionary pathways do not exist, the computer program aborts 1136. If the evolutionary pathways exist 1134, the program calls an evolution tool 1138, to modify the saved data so that consistency with the new location is maintained.

If the format is the same version or release as the new database structure 1132, or after the evolution of data has occurred 1138, the data is error checked 1140. The program dynamically manipulates and modifies the data 1141. All selected dialing plan data that is saved is loaded 1142 or merged into a new or existing dialing plan data resource using a platform utility that converts the data from an ASCII format to a binary format and loads the data into the database. The computer program displays 1144 all the statistics of the data elements as they are being loaded into the selected location. In addition, the computer program displays errors, updates, non-updates to the selected location data resource. The computer program then allows the user to return to the main menu or quit, (exit the program) 1146.

Figure 13:
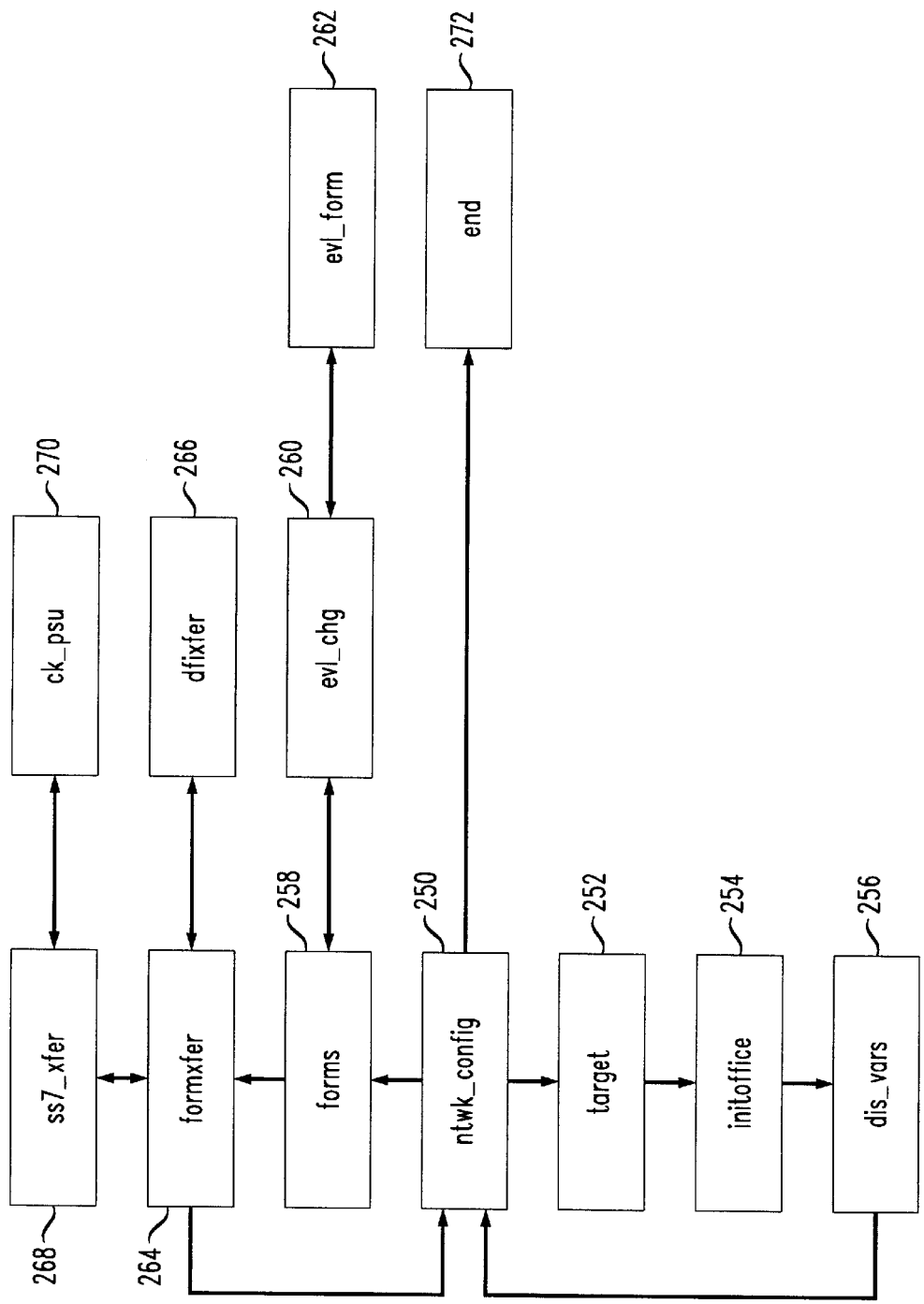
FIG. 13 is a flow chart of the network configuration database feature configuration of the computer program.

FIG. 13 illustrates the netwk_config feature 250 that is used to engineer the data switching networks by using data from existing databases. The objective is to transfer an entire switching network from one configuration to another. The use will have to select the type of switching network signaling being used, the global switch modules, the new point code locations, and trunk equipment numbers. SEES will transfer the data from one hardware platform to another while reconfiguring the network to its new environment.

The user starts from the engineering/create database feature. After selecting the netwk_config feature 250, the user will use the network engineering features. Data is engineered from the office data administration tool data elements directly into the selected "base&control" or database. The user is then required to input the target database 252. Call initoffice routine 254 checks for an existing target database and queries the user as to whether that database should be removed or whether new data will be added to the existing database. If new data is added, the existing database remains unchanged.

The computer program calls the display variables (dis_vars) routine 256 to set and display selected variables such as lab, office data administration tool version. SEES does this task by using the env_menu routine to select the data from preexisting databases. Once found, this data is engineered into the target database. The program then returns to the netwk_config feature 250 to obtain a list of special network data elements from the selected source database or "base&control." Only those data elements with containing data are shown as a selection.

The network configuration feature 250 shows all the data elements block 258 from the source database and allows the user to select the individual data elements manually. This task is accomplished from a menu type screen with each form dynamically identified and selected by a number.

The computer program then copies or dumps the user selected data elements into the target database or "base&control." All data elements are error checked prior to the execution of the dump or copy. If the operation is an append to an existing database, then SEES dumps to an existing form. The formxfer routine is then called.

The evlchg routine 260 takes one argument and the argument passed is the filename of the script that will be used to make the data changes when the evolve tool is executed. SEES then calls the evl_form routine 262. The evl_form routine 262 takes two arguments. The first argument passed is the office data administration tool form name and the second argument is the filename where the contents of the office data administration tool form was dumped. This routine will check to see if there is a possible office data administration tool evolve to go between the two required generics and will perform all necessary step evolves to accomplish the tasks.

The data elements block 258 proceeds to the formxfer block 264. The formxfer block 264 uses the dfixfer block 266 to calculate the new trunk members in accordance with the new network or lab configuration form user assigned EN's. It will also differentiate between ENTRK1s, Ns, Trunk equipment numbers, etc. and treat them differently. If it is not, then ENTRK1 PASS is set to 1 so that the correct line in mkscript gets written to the SEDL script and conversely this also occurs for TRK1. This dynamically writes an evolve script, if a pathway exists, manipulating the data. The dfixfer block 266 also checks for FIELDTYPE to determine if the last line to the SEDL script should be written. SEES then returns to netwk_config after the evolve/transfer is completed.

The ss7_xfer routine 268 calculates the new global switch modules and pointcodes in accordance with the new network or lab configuration from the user assigned information. Other options exist such as SS7 type parameters and link data elements. The ck_psu routine 270 will check all available resources on the PSU's for room to support the transitioned links. SEES then returns the user to netwk_config after the evolve/transfer is completed. The user is then prompted as to whether the user wants to exit 272 or return to the main menu.

Figure 14:
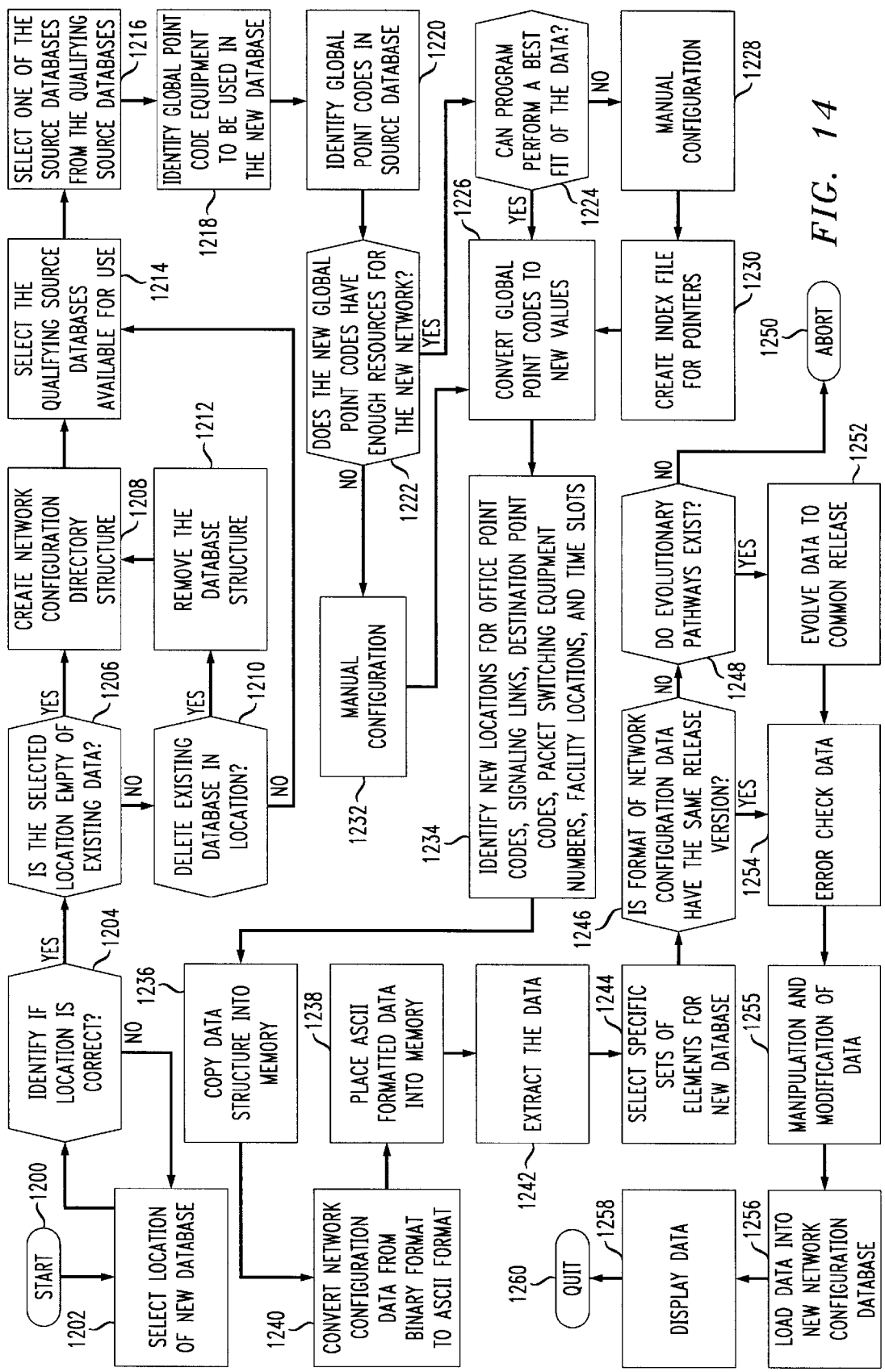
FIG. 14 is a flow chart of the network configuration database feature configuration of the computer program.

FIG. 14 illustrates the process of engineering a new hardware equipment configuration database or data resource from at least one source database or source data resource. The user calls and starts 1200 the computer program. The computer program can be located on one machine (a computer device) or multiple machines virtually connected via a network file share capability allowing all the virtual machines to appear as one machine and containing all existing source databases or source data resources. In the main menu of the computer program, a text or graphical user interface presents the main menu to the user allowing the user to select whether to browse existing source databases and source data resources or whether the user desires to create a new source database or engineer (modify) an existing source database from all or parts of other existing source databases or source data resources.

When the user selects the hardware equipment engineering feature, the user is required to select the location of the new dialing plan database 1202. Selecting means selecting an item from a menu or imputing information such that the computer can react to the instruction. In addition, the user must select whether the new or modified hardware equipment database should be located on the same machine (computer) or a virtual machine (computer), should the hardware equipment database be created or modified, and whether the hardware equipment database should be inclusively updated. The location of the new database 1202 is confirmed 1204 with the user and if the confirmation is not correct, the computer program allows the user to reselect a different location 1202.

The computer program searches or checks the node or location where the user intends for the new or modified hardware equipment database to be located. This node check will confirm the actual location of the hardware equipment database, and whether the node is free 1206 on the desired machine (computer). The computer program confirms whether the selected location of the new database is empty of existing data 1206. If the response from the user is yes, the computer program creates a new hardware equipment directory structure 1208. If the response is no, the program allows the user to delete the existing database 1210. If the database is deleted, the program removes the database structure 1212 and creates a new hardware equipment directory structure 1208. The hardware equipment directory structure can be created to hold similar and dissimilar size data as compared to the source databases.

If the existing database structure is not deleted, or the program created a new hardware equipment directory structure, the computer program then allows the user to select the qualifying source databases available for use 1214. The source databases might have access utilities to assist the in the configuration of a new database. The computer program then selects qualifying existing source data resources using the user set criteria in input when the user was prompted to select the lab, machine (computer), site, customer name, and software release. The computer program requires the user to select and input certain elements regarding the characteristics desired in the new hardware equipment database to be created in order to search existing source databases and source data resources for existing data. For example, the user will be prompted to select the lab, the computer or machine, the site location of the new or modified hardware equipment database, the customer name, the software release, and the version of the source database or source data resource.

The computer program instructs the user to select the source databases from the qualifying source databases 1216. The user identifies the global point code equipment to be used in the new database 1218 and identify the global point codes in the source databases 1220.

The computer program queries the user as to whether the global point codes equipment have enough resources for the new network configuration 1222. If the program can automatically generate a best fit of the data 1224, the computer program converts the global point code values to the new values 1226. If the computer program can not perform a best fit of the data, the program allows the user to manually configure 1228 the data and creates an index file 1230 for pointers prior to converting the global point codes to the new values 1226. If the response to the first query 1222, is no, the program allows the user to manually configure 1232 the data and then converts the global point codes to the new values 1226.

The user identifies the new locations 1234 for office point codes, signaling links, destination point codes, packet switching equipment numbers, facility locations, and time slots. The data structure is copied into memory 1236 and the data is converted from a binary format to an ASCII format 1240. The ASCII formatted data is placed into memory 1238 and the computer program extracts the data from memory 1242. After extraction, the computer program selects the specific sets of elements for the new database 1244. The program determines if this format is the same version or release as the new database structure 1246. This is accomplished by matching the selected criteria in the software release with the new or existing software release of the directory structure and name. If the format is not the same, the computer program determines if evolutionary pathways exist 1248. If the evolutionary pathways do not exist, the computer program aborts 1250. If the evolutionary pathways exist 1248, the program calls an evolution tool 1252, to modify the saved data so that consistency with the new location is maintained.

If the format is the same version or release as the new database structure 1246, or after the evolution of data has occurred 1252, the data is error checked 1254. The program dynamically manipulates and modifies the data 1255. All selected dialing plan data that is saved is loaded 1256 or merged into a new or existing dialing plan data resource using a platform utility that converts the data from an ASCII format to a binary format and loads the data into the database. The computer program displays 1258 all the statistics of the data elements as they are being loaded into the selected location. In addition, the computer program displays errors, updates, non-updates to the selected location data resource. The computer program then allows the user to return to the main menu or quit, (exit the program) 1260.

The design of a global intelligent network configuration includes many factors. These factors include evaluating the technical alternatives such as determining the information to be exchanged and the appropriate signaling messages, parameters, and fields to transport that information; defining numbering plans and dialing patterns; establishing performance objectives such as call setup time, reliability, capacity, and transmission quality; defining network management controls; determining end-to-end testing procedures; designing maintenance procedures; defining recording, billing, and settlement procedures; and establishing procedures for provisioning.

Figure 15:
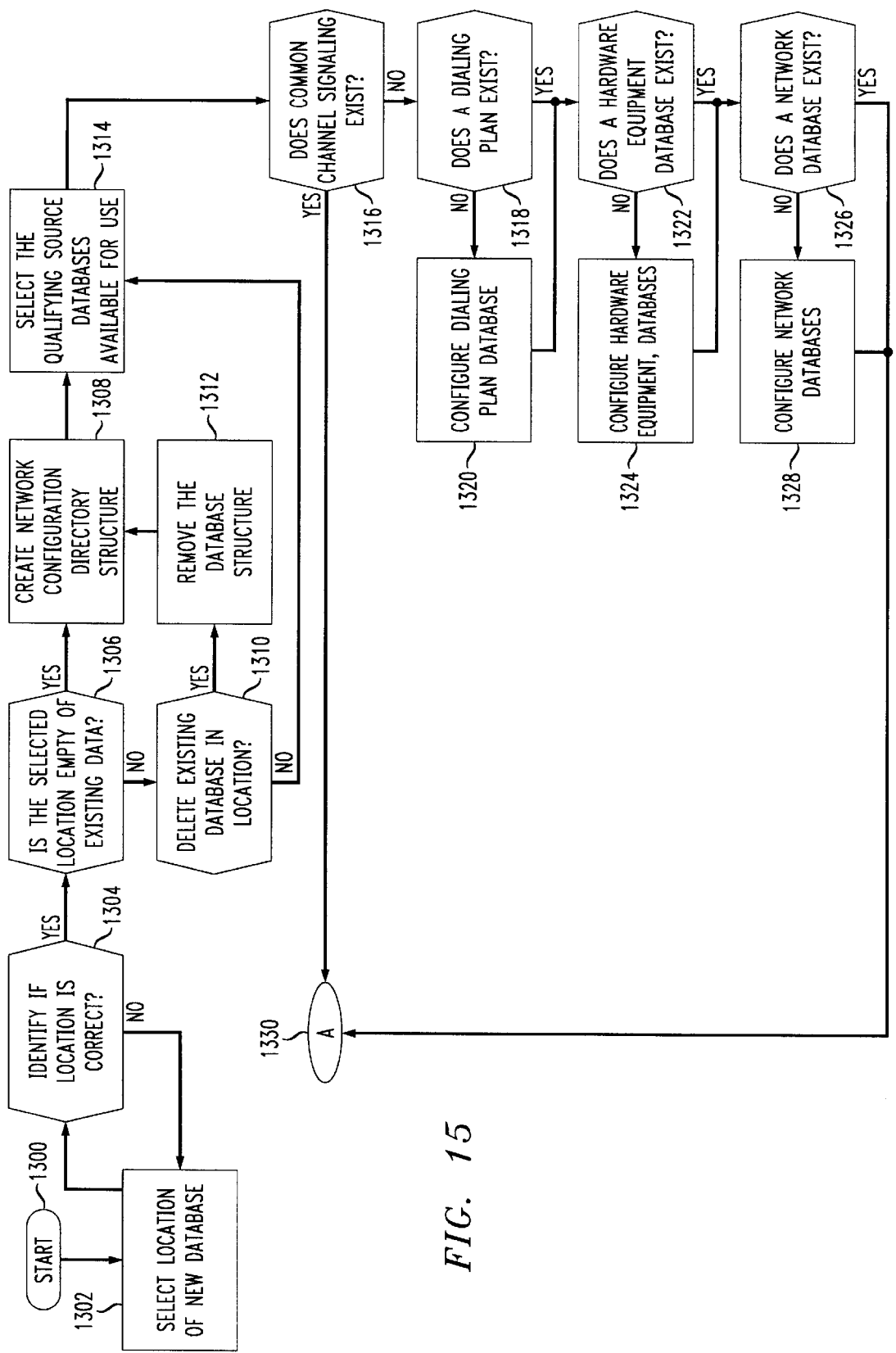
FIG. 15 is a flow chart of the intelligent network configuration database feature configuration of the computer program.
Figure 16:
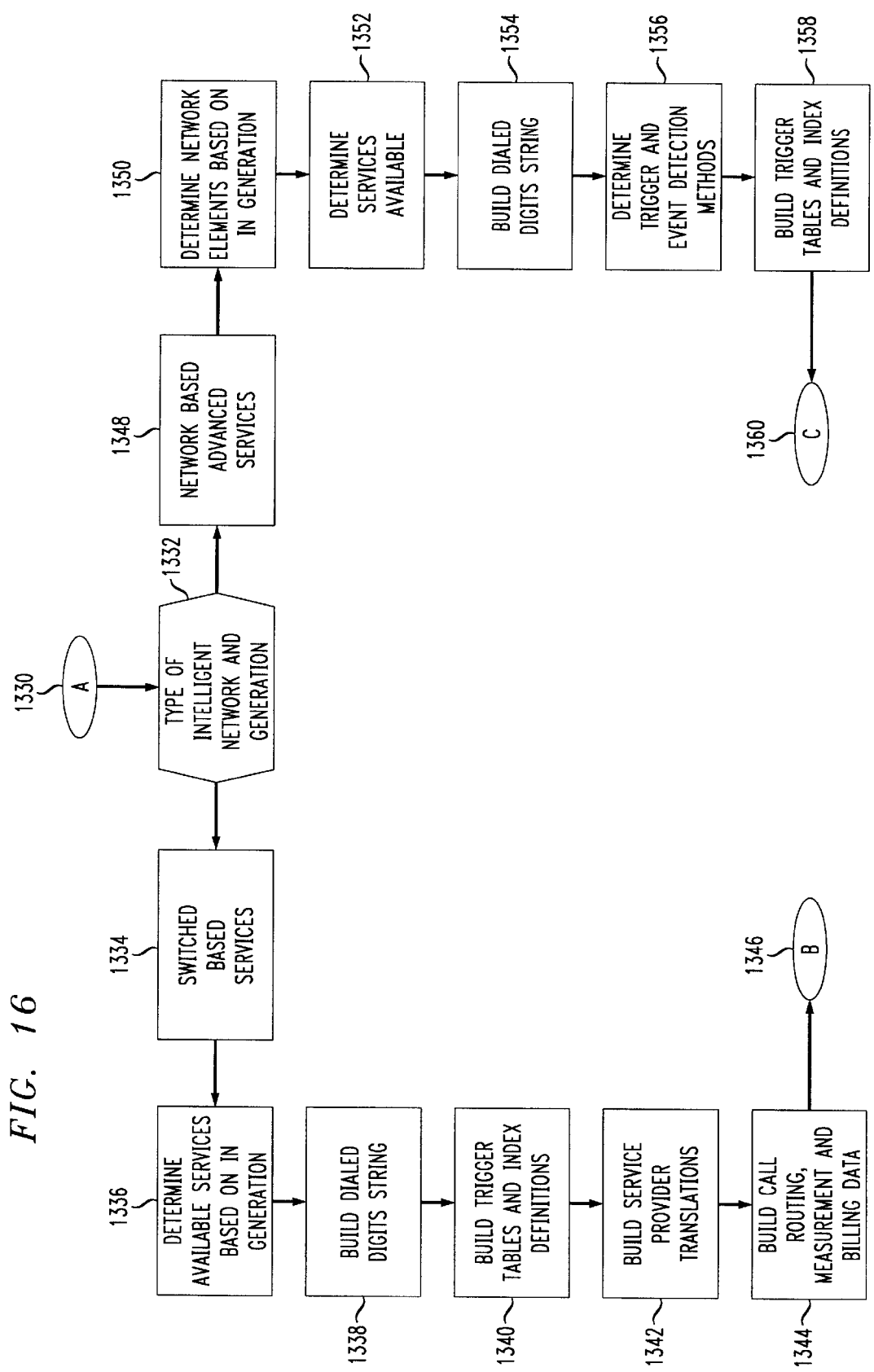
FIG. 16 is a flow chart of the intelligent network configuration database feature configuration of the computer program.
Figure 17:
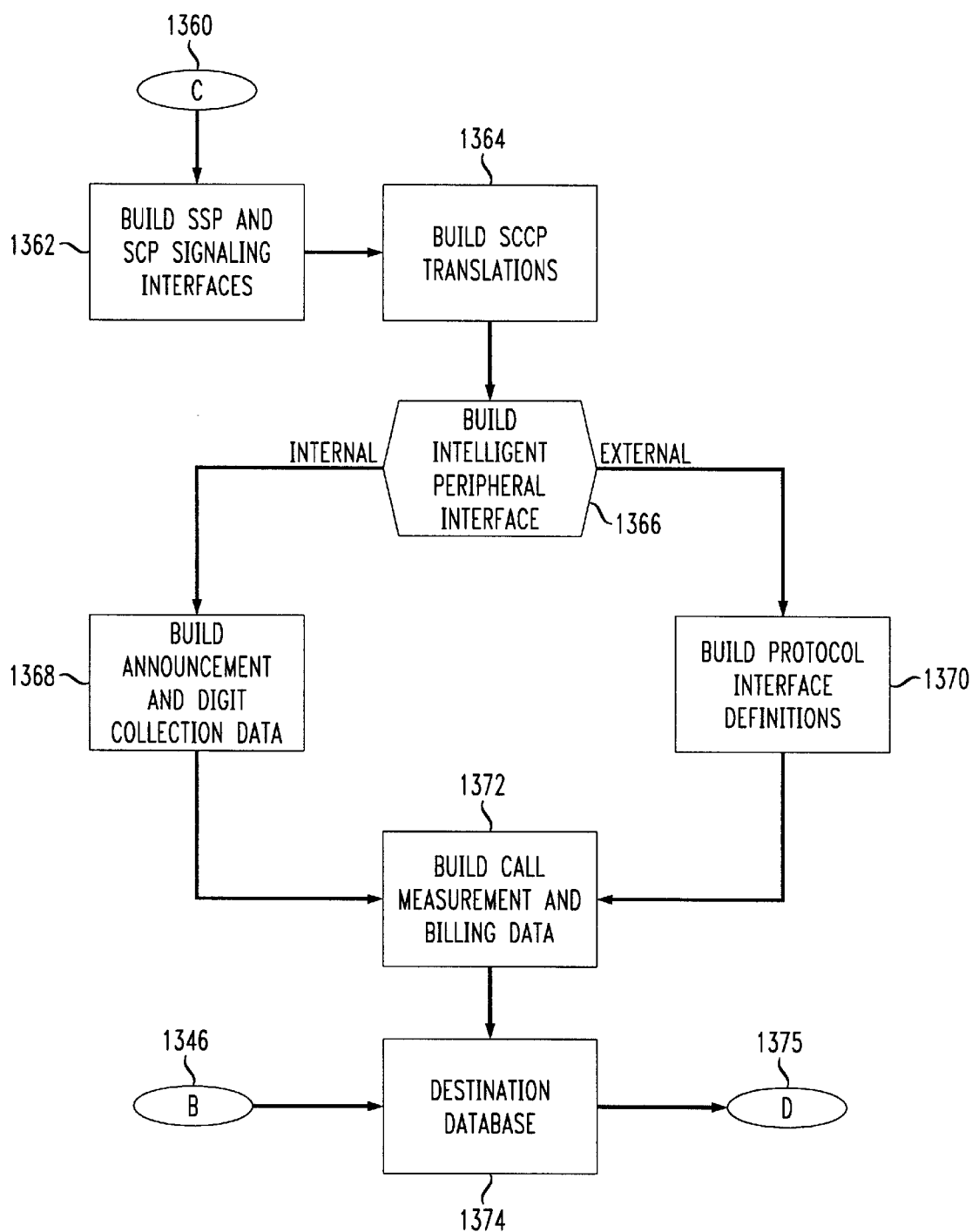
FIG. 17 is a flow chart of the intelligent network configuration database feature configuration of the computer program.
Figure 18:
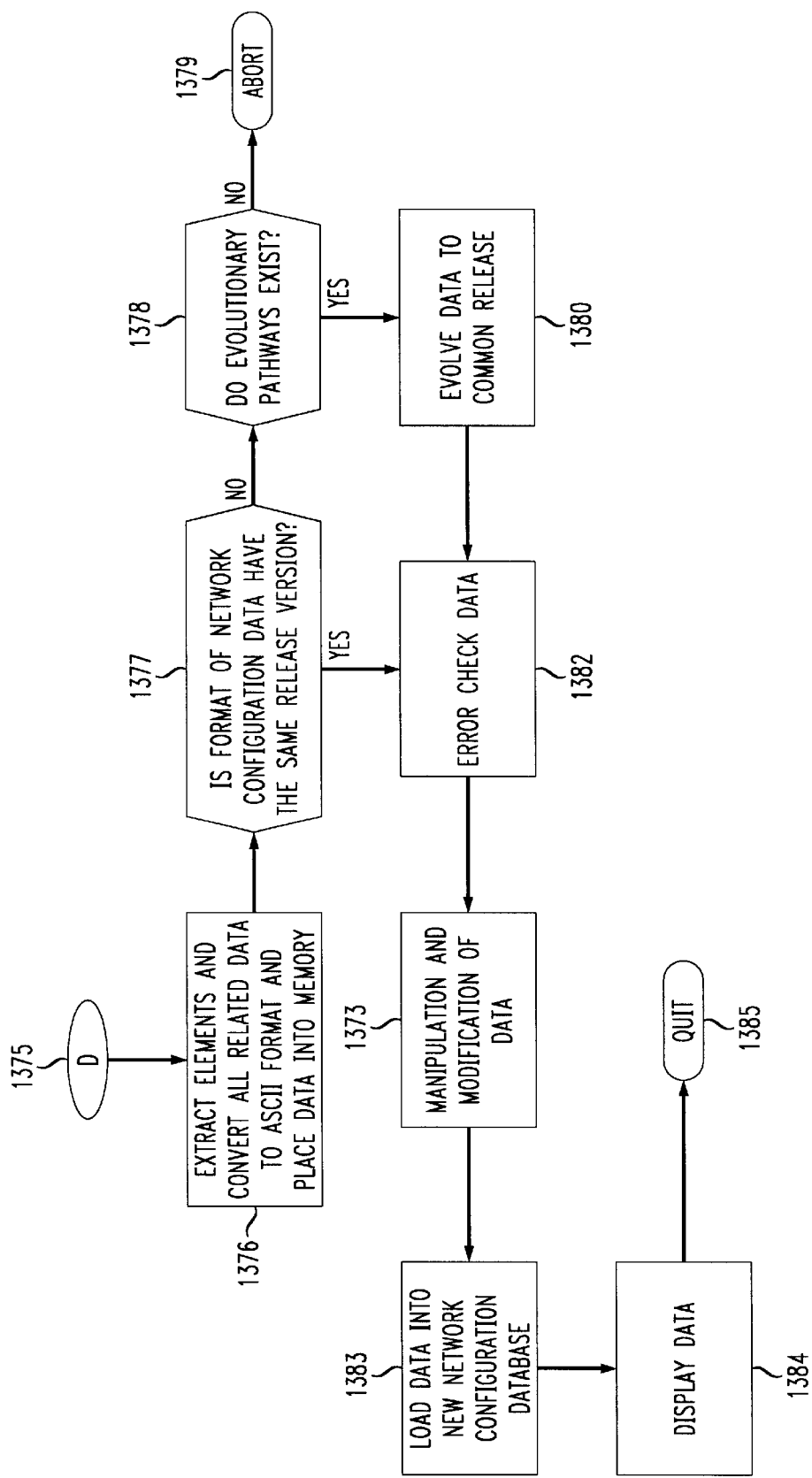
FIG. 18 is a flow chart of the intelligent network configuration database feature configuration of the computer program.

FIGS. 15 through 18 illustrates flow charts for configuring an intelligent network. FIG. 15 illustrates the process of engineering a new hardware equipment configuration database or data resource from at least one source database or source data resource. The user calls and starts 1300 the computer program. The computer program can be located on one machine (a computer device) or multiple machines virtually connected via a network file share capability allowing all the virtual machines to appear as one machine and containing all existing source databases or source data resources. In the main menu of the computer program, a text or graphical user interface presents the main menu to the user allowing the user to select whether to browse existing source databases and source data resources or whether the user desires to create a new source database or engineer (modify) an existing source database from all or parts of other existing source databases or source data resources.

When the user selects the intelligent network engineering feature, the user is required to select the location of the new intelligent network database 1302. Selecting means selecting an item from a menu or imputing information such that the computer can react to the instruction. In addition, the user must select whether the new or modified intelligent network database should be located on the same machine (computer) or a virtual machine (computer), should the intelligent network database be created or modified, and whether the intelligent network database should be inclusively updated. The location of the new database 1302 is confirmed 1304 with the user and if the confirmation is not correct, the computer program allows the user to reselect a different location 1302.

The computer program searches or checks the node or location where the user intends for the new or modified intelligent network database to be located. This node check will confirm the actual location of the intelligent network database, and whether the node is free 1306 on the desired machine (computer). The computer program confirms whether the selected location of the new database is empty of existing data 1306. If the response from the user is yes, the computer program creates a new intelligent network directory structure 1308. If the response is no, the program allows the user to delete the existing database 1310. If the database is deleted, the program removes the database structure 1312 and creates a new intelligent network directory structure 1308. The intelligent network directory structure can be created to hold similar and dissimilar size data as compared to the source databases.

If the existing database structure is not deleted, or the program created a new intelligent network directory structure, the computer program then allows the user to select the qualifying source databases available for use 1314. The source databases might have access utilities to assist the in the configuration of a new database. The computer program then selects qualifying existing source data resources using the user set criteria in input when the user was prompted to select the lab, machine (computer), site, customer name, and software release. The computer program requires the user to select and input certain elements regarding the characteristics desired in the new intelligent network database to be created in order to search existing source databases and source data resources for existing data. For example, the user will be prompted to select the lab, the computer or machine, the site location of the new or modified intelligent network database, the customer name, the software release, and the version of the source database or source data resource.

The computer program queries whether common channel signaling exists 1316. If it does not, a series of queries establishes those features that need configuration. If a dialing plan needs configuring 1318, a dialing plan is configured 1320. If a hardware equipment configuration is required 1322, a hardware equipment configuration is configured 1324. If a network configuration is required 1326, a network configuration is configured 1328. If common channel signaling exists 1316 or if the dialing plan, hardware equipment and network configurations are completed, then connector "A" 1330 links FIG. 15 and FIG. 16.

The computer program queries the user as to the type of intelligent network (switch based or network based advanced services) and generation 1332 for the new database. Either switch based or network based corresponds to a specific intelligent network architecture. If the user selects a switched based services 1334, the switch based intelligent network services are determined and are commonly known as Service Switching and Control Point (SSCP) services 1336 include SSCP free phone service, SSCP calling card service, and SSCP virtual private network service. Free phone service provides service subscribers with variable toll and toll free calling capabilities by routing traffic to a specified location. Calling card service feature allows the service administration to provide calling cards for charging telecommunication experiences. Virtual private network enables the service administrator to provide customers with the same level of services as national and international private networks.

The computer program builds dialed digit strings 1338 and builds trigger tables and index definitions 1340 such as trigger detection points for analyzed information. The computer program also builds service provider translations 1342 and builds call routing, measurement and billing data 1344. Connector B 1346 links FIG. 16 and FIG. 17 for switch based services.

From the type of intelligent network and generation 1332, the network based services 1348 can be selected. The network based services include advanced routing services, advanced free phone service, mass calling services, network automatic call distribution, premium charging service, split charging service, universal number service, single destination services, virtual private network, calling card service, personal number service, and televoting service/mass calling. Advanced routing services allow subscribers to how a subscriber's call will be routed based on service logic that is customized to the subscriber. Advanced free phone service supports sophisticated toll free and other service offerings such as alternate destination on busy signal, call barring, call percentage allocator, call prompter, call queuing, command routing, customized terminating announcements, routing by subscriber geography, routing by day of week, routing by day of year, routing by holiday, routing by time of day, and standard terminating announcements.

Mass calling services involves routing instantaneous, high volume traffic to the intelligent network. This often occurs with the opening sales of concert tickets or responses to radio promotions. Network automatic call distribution involves the distribution of calls among any number of answering bureaus separated by geography. Premium charging service offers value added services such as outcomes of sporting events or stock exchange information. Split charging service divides charges for calls between the caller and the service subscriber. Universal number service supports users who want to advertise a single telephone number by which their customers can reach them from anywhere in the country. Single destination services provides a single translation from a service subscriber number to a single public switched telephone network (PSTN) destination number.

Virtual private network service allows a network provider to offer service subscribers a service equivalent to that of any private network without requiring dedicated network resources. Calling card services allow subscribers to charge their telecommunication calls to a calling card. Personal number service provides a remote call forwarding mechanism for service subscribers who travel from one location to another and need a convenient way to receive calls. Televoting service/mass calling provides a mechanism for surveying the public for information via the telephone network.

The computer program supports these services and allows for their configuration into new databases that support intelligent network service. The program determines the network elements 1350 based on the user input of the desired services to be configured. The program queries the user as to the types of services desired 1352 in the new database. The program builds the dialed digit strings 1354 and determines the trigger and event detection methods 1356. The trigger detection points and the event detection points include collected information trigger detection points, analyzed information trigger detection points, route select failure event detection points, no answer event detection points, line busy event detection points, call disconnect event detection points, and call abandoned event detection points. The computer program builds trigger tables and index definitions 1358. Connector "C" 1360 links FIG. 16 and FIG. 17 for the network based services.

The computer program builds service switching point (SSP) and service control point (SCP) signaling interfaces 1362. The SSP identifies the intelligent network calls through ITU-T defined trigger detection points and obtains call handling information from the SCP database prior to processing the call. The SSP can also provide the network access point (NAP) functionality that serves to initially identify intelligent network calls and route them to the SCP for further processing.

The computer program also builds signaling connection control part (SCCP) translations 1364. The program builds the intelligent peripheral interface 1366 that supports either the internal build announcement and digit collection data 1368 or the external build protocol interface definitions 1370. The program also builds call routing, measurement and billing data 1372. The destination database 1374 is the next step for the network based services and also is the entry point from connection "B" 1346 from the switch based services. Connector "D" 1375 links FIG. 17 and FIG. 18.

The destination database 1374 has its elements extracted, the elements are converted to an ASCII format and placed into memory 1376. The program determines if this format is the same version or release as the new database structure 1377. This is accomplished by matching the selected criteria in the software release with the new or existing software release of the directory structure and name. If the format is not the same, the computer program determines if evolutionary pathways exist 1378. If the evolutionary pathways do not exist, the computer program aborts 1379. If the evolutionary pathways exist 1378, the program calls an evolution tool 1380, to modify the saved data so that consistency with the new location is maintained.

If the format is the same version or release as the new database structure 1377, or after the evolution of data has occurred 1380, the data is error checked 1382. The program dynamically manipulates and modifies the data 1373. All selected dialing plan data that is saved is loaded 1383 or merged into a new or existing dialing plan data resource using a platform utility that converts the data from an ASCII format to a binary format and loads the data into the database. The computer program displays 1384 all the statistics of the data elements as they are being loaded into the selected location. In addition, the computer program displays errors, updates, non-updates to the selected location data resource. The computer program then allows the user to return to the main menu or quit, (exit the program) 1385.

Please note that while the specification in this invention has been described in relation to certain preferred embodiments, it will be apparent to those skilled in the art that the invention is capable of alternative embodiments and that certain embodiments described in this invention can be varied considerably without departing from the basic scope and principles of the invention.

What is claimed is:

1. A process for configuring an intelligent network database comprising the steps of:
   searching at least one source database for switch based services data fields;
   selecting switched based data from the switch based data fields;
   copying the switched based data from the at least one source database to a new database; and matching subscribers to the switched based data in the new database;

wherein the step of copying the switched based data from the at least one source database to the new database comprises the step of:

allowing a user to select any of a plurality of configuration scheme features, wherein the plurality of configuration scheme features comprises a hardware engineering feature, a dialing plan engineering feature, a network engineering feature, an operator services feature, and a private branch exchange feature.

2. The process for configuring the intelligent network database described in claim 1, where the switched based data from the at least one source database is copied to a similar sized data structure in the new database.

3. The process for configuring the intelligent network database described in claim 1, where the switched based data from the at least one source database is copied to a dissimilar sized data structure in the new database.

4. The process for configuring the intelligent network database described in claim 1, where the switched based data comprises service switching and control point data.

5. The process for configuring the intelligent network database described in claim 4, where the switched based data comprises free phone service data.

6. The process for configuring the intelligent network database described in claim 4, where the switched based data comprises calling card service data.

7. The process for configuring the intelligent network database described in claim 4, where the switched based data comprises virtual private network service data.

8. A process for configuring an intelligent network database comprising the steps of:

searching at least one source database for intelligent network based services data fields;

selecting intelligent network based data from the intelligent network based data fields;

copying the intelligent network based data from the at least one source database to a new database; and matching subscribers to the intelligent network based data in the new database;

wherein the step of copying the intelligent network based data from the at least one source database to the new database comprises the step of:

allowing a user to select any of a plurality of configuration scheme features, wherein the plurality of configuration scheme features comprises a hardware engineering feature, a dialing plan engineering feature, a network engineering feature, an operator services feature, and a private branch exchange feature.

9. The process for configuring the intelligent network database described in claim 8, where the intelligent network based data from the at least one source database is copied to similar sized data structure in the new database.

10. The process for configuring the intelligent network database described in claim 8, where the network based data from the at least one source database is copied to dissimilar sized data structure in the new database.

11. The process for configuring the intelligent network database described in claim 8, where the network based data comprises advanced routing service data.

12. The process for configuring the intelligent network database described in claim 8, where the network based data comprises advanced free phone service data.

13. The process for configuring the intelligent network database described in claim 8, where the network based data comprises mass calling services data.

14. The process for configuring the intelligent network database described in claim 8, where the network based data comprises network automatic call distribution data.

15. The process for configuring the intelligent network database described in claim 8, where the network based data comprises premium charging service data.

16. The process for configuring the intelligent network database described in claim 8, where the network based data comprises split charging service data.

17. The process for configuring the intelligent network database described in claim 8, where the network based data comprises universal number service data.

18. The process for configuring the intelligent network database described in claim 8, where the network based data comprises single destination services data.

19. The process for configuring the intelligent network database described in claim 8, where the network based data comprises virtual private network data.

20. The process for configuring the intelligent network database described in claim 8, where the network based data comprises calling card service data.

21. The process for configuring the intelligent network database described in claim 8, where the network based data comprises personal number service data.

22. The process for configuring the intelligent network database described in claim 8, where the network based data comprises mass calling data.

23. A process for configuring an intelligent network database comprising the steps of:

searching at least one source database for switched based data fields;

selecting switched based data from the switched based data fields;

copying the switched based data from the at least one source database to a new database;

building dialed digit strings for the new database; and matching subscribers to the switched based data in the new database;

wherein the step of copying the switched based data from the at least one source database to the new database comprises the step of:

allowing a user to select any of a plurality of configuration scheme features, wherein the plurality of configuration scheme features comprises a hardware engineering feature, a dialing plan engineering feature, a network engineering feature, an operator services feature, and a private branch exchange feature.

24. The process for configuring the intelligent network database described in claim 23, further comprising the step of building trigger tables for the new database.

25. The process for configuring the intelligent network database described in claim 23, further comprising the step of building index definitions for the new database.

26. The process for configuring the intelligent network database described in claim 23, further comprising the step of building service provider translations for the new database.

27. The process for configuring the intelligent network database described in claim 23, further comprising the step of building call routing data for the new database.

28. The process for configuring the intelligent network database described in claim 23, further comprising the step of building call measurement data for the new database.

29. The process for configuring the intelligent network database described in claim 23, further comprising the step of building billing data for the new database.

30. A process for configuring an intelligent network database comprising the steps of:
   searching at least one source database for network based data fields;
   selecting network based data from the network based data fields;
   copying the network based data from the at least one source database to a new database;
   building dialed digit strings for the new database; and
   matching subscribers to the network based data in the new database;
   wherein the step of copying the network based data from the at least one source database to the new database comprises the step of:
      allowing a user to select any of a plurality of configuration scheme features, wherein the plurality of configuration scheme features comprises a hardware engineering feature, a dialing plan engineering feature, a network engineering feature, an operator services feature, and a private branch exchange feature.

31. The process for configuring the intelligent network database described in claim 30, further comprising the step of determining trigger detection methods for the new database.

32. The process for configuring the intelligent network database described in claim 30, further comprising the step of determining event detection methods for the new database.

33. The process for configuring an intelligent network database described in claim 30, further comprising the step of building trigger tables for the new database.

34. The process for configuring an intelligent network database described in claim 30, further comprising the step of building index definitions for the new database.

35. The process for configuring an intelligent network database described in claim 30, further comprising the step of building service switching point signaling interfaces for the new database.

36. The process for configuring the intelligent network database described in claim 30, further comprising the step of building service control point interfaces for the new database.

37. The process for configuring the intelligent network database described in claim 30, further comprising the step of building signaling connection control part translations for the new database.

38. The process for configuring the intelligent network database described in claim 30, further comprising the step of building intelligent peripheral interfaces for the new database.

39. The process for configuring the intelligent network database described in claim 38, where the intelligent peripheral interfaces for the new database are internal.

40. The process for configuring the intelligent network database described in claim 39, further comprising the step of building announcement data for the new database.

41. The process for configuring the intelligent network database described in claim 39, further comprising the step of building digit collection data for the new database.

42. The process for configuring the intelligent network database described in claim 38, where the intelligent peripheral interfaces for the new database are external.

43. The process for configuring the intelligent network database described in claim 42, further comprising the step of building protocol interface definitions for the new database.

44. The process of claim 1, wherein the step of allowing the user to select any of the plurality of configuration scheme features comprises the step of:
   selecting the hardware engineering feature to comprise an equipment configuration feature and an office dependent database feature;
   wherein the equipment configuration feature serves to allow one or more users to examine one or more properties of one or more administrative modules;
   wherein the office dependent database feature serves to allow communication between one or more communication modules and one or more switch modules.

45. The process of claim 1, wherein the step of allowing the user to select any of the plurality of configuration scheme features comprises the step of:
   selecting the dialing plan engineering feature to comprise a feature engineering feature, a signal network engineering feature, and a dialing plan feature;
   wherein the feature engineering feature serves to pull one or more existing features from one or more other databases that contain one or more feature definitions with embedded office dependent information into a new environment modified to the new database;
   wherein the signal network engineering feature serves to transfer data content regarding signaling information;
   wherein the dialing plan feature serves to map numbers that serve to differentiate a route of a call.

46. The process of claim 1, wherein the step of allowing the user to select any of the plurality of configuration scheme features comprises the step of:
   selecting the operator services feature to comprise one or more of directory assistance, one or more toll and assistance applications, administrator measurements-operator, one or more automated calling card services, automated operator trainer, automatic call distribution, busy line verification, and one or more emergency alerts.

47. The process of claim 8, wherein the step of allowing the user to select any of the plurality of configuration scheme features comprises the step of:
   selecting the hardware engineering feature to comprise an equipment configuration feature and an office dependent database feature;
   wherein the equipment configuration feature serves to allow one or more users to examine one or more properties of one or more administrative modules;
   wherein the office dependent database feature serves to allow communication between one or more communication modules and one or more switch modules.

48. The process of claim 8, wherein the step of allowing the user to select any of the plurality of configuration scheme features comprises the step of:
   selecting the dialing plan engineering feature to comprise a feature engineering feature, a signal network engineering feature, and a dialing plan feature;
   wherein the feature engineering feature serves to pull one or more existing features from one or more other databases that contain one or more feature definitions with embedded office dependent information into a new environment modified to the new database;
   wherein the signal network engineering feature serves to transfer data content regarding signaling information;

wherein the dialing plan feature serves to map numbers that serve to differentiate a route of a call.

49. The process of claim 8, wherein the step of allowing the user to select any of the plurality of configuration scheme features comprises the step of:

selecting the operator services feature to comprise one or more of directory assistance, one or more toll and assistance applications, administrator measurements-operator, one or more automated calling card services, automated operator trainer, automatic call distribution, busy line verification, and one or more emergency alerts.

50. The process of claim 23, wherein the step of allowing the user to select any of the plurality of configuration scheme features comprises the step of:

selecting the hardware engineering feature to comprise an equipment configuration feature and an office dependent database feature;

wherein the equipment configuration feature serves to allow one or more users to examine one or more properties of one or more administrative modules;

wherein the office dependent database feature serves to allow communication between one or more communication modules and one or more switch modules.

51. The process of claim 23, wherein the step of allowing the user to select any of the plurality of configuration scheme features comprises the step of:

selecting the dialing plan engineering feature to comprise a feature engineering feature, a signal network engineering feature, and a dialing plan feature;

wherein the feature engineering feature serves to pull one or more existing features from one or more other databases that contain one or more feature definitions with embedded office dependent information into a new environment modified to the new database;

wherein the signal network engineering feature serves to transfer data content regarding signaling information;

wherein the dialing plan feature serves to map numbers that serve to differentiate a route of a call.

52. The process of claim 23, wherein the step of allowing the user to select any of the plurality of configuration scheme features comprises the step of:

selecting the operator services feature to comprise one or more of directory assistance, one or more toll and assistance applications, administrator measurements-operator, one or more automated calling card services, automated operator trainer, automatic call distribution, busy line verification, and one or more emergency alerts.

53. The process of claim 30, wherein the step of allowing the user to select any of the plurality of configuration scheme features comprises the step of:

selecting the hardware engineering feature to comprise an equipment configuration feature and an office dependent database feature;

wherein the equipment configuration feature serves to allow one or more users to examine one or more properties of one or more administrative modules;

wherein the office dependent database feature serves to allow communication between one or more communication modules and one or more switch modules.

54. The process of claim 30, wherein the step of allowing the user to select any of the plurality of configuration scheme features comprises the step of:

selecting the dialing plan engineering feature to comprise a feature engineering feature, a signal network engineering feature, and a dialing plan feature;

wherein the feature engineering feature serves to pull one or more existing features from one or more other databases that contain one or more feature definitions with embedded office dependent information into a new environment modified to the new database;

wherein the signal network engineering feature serves to transfer data content regarding signaling information;

wherein the dialing plan feature serves to map numbers that serve to differentiate a route of a call.

55. The process of claim 30, wherein the step of allowing the user to select any of the plurality of configuration scheme features comprises the step of:

selecting the operator services feature to comprise one or more of directory assistance, one or more toll and assistance applications, administrator measurements-operator, one or more automated calling card services, automated operator trainer, automatic call distribution, busy line verification, and one or more emergency alerts.

\* \* \* \* \*

UNITED STATES PATENT AND TRADEMARK OFFICE
CERTIFICATE OF CORRECTION

PATENT NO. : 6,324,547 B1　　　　　　　　　　　　　　　　　　　　　　　　Page 1 of 1
DATED : November 27, 2001
INVENTOR(S) : Lennert et al.

It is certified that error appears in the above-identified patent and that said Letters Patent is hereby corrected as shown below:

Title page,
In the Title, delete "MODIFING" and insert -- MODIFYING --.

Signed and Sealed this

Ninth Day of April, 2002

*Attest:*

*Attesting Officer*　　　　JAMES E. ROGAN
　　　　　　　　　　*Director of the United States Patent and Trademark Office*